United States Patent
Yoshizumi

(10) Patent No.: US 8,638,372 B2
(45) Date of Patent: Jan. 28, 2014

(54) IMAGE CAPTURE UNIT WITH CHANGEABLE IMAGE CAPTURE DIRECTION

(75) Inventor: Shingo Yoshizumi, Tokyo (JP)

(73) Assignee: Sony Corporation (JP)

( * ) Notice: Subject to any disclaimer, the term of this patent is extended or adjusted under 35 U.S.C. 154(b) by 562 days.

(21) Appl. No.: 12/653,170

(22) Filed: Dec. 9, 2009

(65) Prior Publication Data

US 2010/0157075 A1 Jun. 24, 2010

(30) Foreign Application Priority Data

Dec. 18, 2008 (JP) ................................ P2008-322306

(51) Int. Cl.
*H04N 5/232* (2006.01)
(52) U.S. Cl.
USPC ................. 348/211.9; 348/207.99; 348/222.1
(58) Field of Classification Search
USPC ................................. 348/211.9, 222.1, 207.99
See application file for complete search history.

(56) References Cited

U.S. PATENT DOCUMENTS

| | | | |
|---|---|---|---|
| 6,203,216 B1 * | 3/2001 | Koizumi | 396/427 |
| 6,445,410 B2 * | 9/2002 | Kawano | 348/211.1 |
| 6,661,450 B2 | 12/2003 | Yata | |
| 6,930,703 B1 * | 8/2005 | Hubel et al. | 348/37 |
| 2003/0076440 A1 * | 4/2003 | Terane | 348/373 |
| 2003/0165192 A1 * | 9/2003 | Kitta | 375/240.01 |
| 2004/0004671 A1 * | 1/2004 | Takahashi | 348/375 |
| 2004/0223062 A1 * | 11/2004 | Pettegrew et al. | 348/211.4 |
| 2005/0122424 A1 * | 6/2005 | Overstreet | 348/373 |
| 2007/0040894 A1 * | 2/2007 | Kikugawa | 348/14.01 |

FOREIGN PATENT DOCUMENTS

| | | |
|---|---|---|
| JP | 2001-268425 A | 9/2001 |
| JP | 2001346090 A | 12/2001 |
| JP | 2005003852 A | 1/2005 |
| JP | 2005010512 A | 1/2005 |
| JP | 2006191524 A | 7/2006 |
| JP | 2006261915 A | 9/2006 |
| JP | 2007215136 A | 8/2007 |
| JP | 2008118475 A | 5/2008 |

OTHER PUBLICATIONS

Office Action from Japanese Application No. 2008-322306, dated Oct. 19, 2010.
Office Action from Japanese Application No. 2008-322306, dated Jan. 11, 20111.

* cited by examiner

*Primary Examiner* — Usman Khan
(74) *Attorney, Agent, or Firm* — Lerner, David, Littenberg, Krumholz & Mentlik, LLP

(57) ABSTRACT

An image capture system includes: an automatic photography controlling section for executing an automatic photography operation to thereby obtain captured-image data from an image resulting from image capture performed by an image-capture section; a display section having a display screen section on which the image is displayed; a moving mechanism section having a mechanism for moving a movement unit so that a display direction of the display section is changed in conjunction with an image-capture direction; a captured-image display controlling section for controlling the display section so that the image of the obtained captured-image data is displayed on the display screen section; and a movement controlling section for controlling the moving mechanism section so as to move the movement unit so that the display direction is directed toward a subject person in a mode in which the image of the captured-image data is displayed.

14 Claims, 30 Drawing Sheets

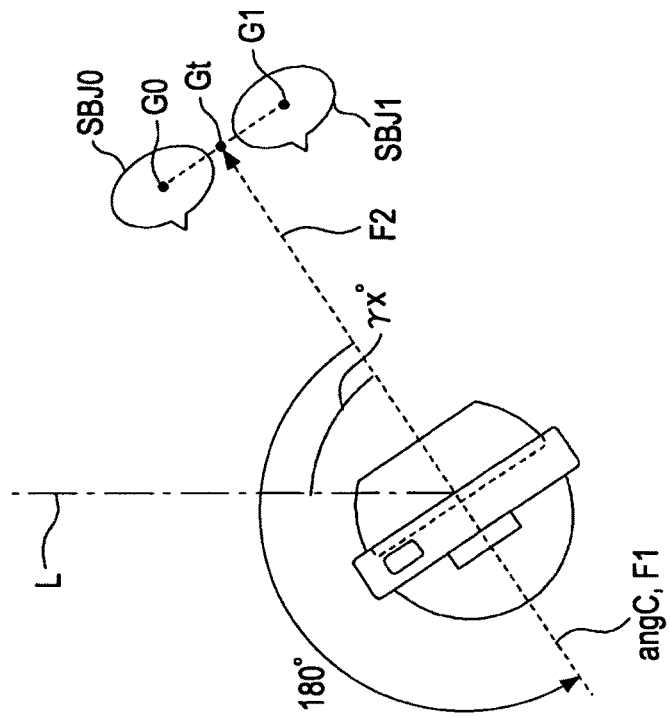
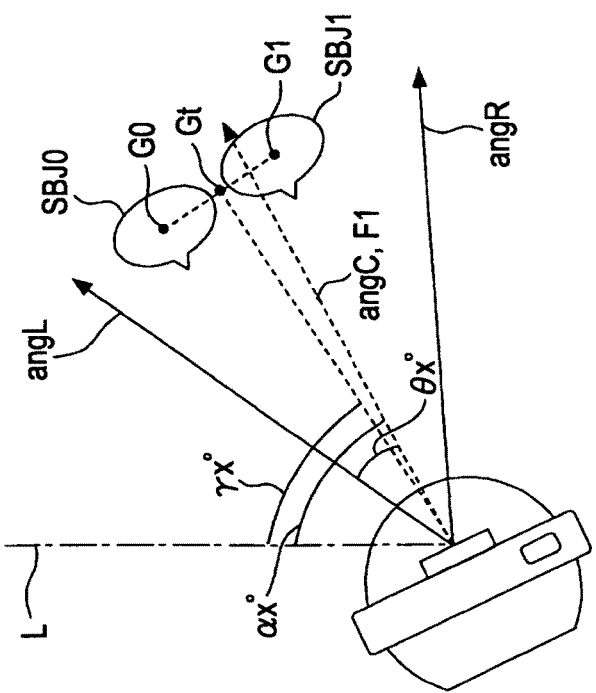

| NO. | SUBJECT POSITION ($\gamma x°$) |
|---|---|
| 1 | 330° |
| 2 | 20° |
| 3 | 150° |
| 4 | 200° |

| IMAGE ID | IMAGE-CAPTURE POSITION ($\alpha x°$) |
|---|---|
| 0001 | 355° |
| 0002 | 200° |
| 0003 | 150° |
| 0004 | 330° |

FIG. 29A

| SUBJECT NO. | INDIVIDUAL RECOGNITION DATA |
|---|---|
| 1 | DATA OF SUBJECT PERSON A |
| 2 | DATA OF SUBJECT PERSON B |
| 3 | DATA OF SUBJECT PERSON C |
| 4 | DATA OF SUBJECT PERSON D |

FIG. 29B

| IMAGE ID | SUBJECT NO. |
|---|---|
| 0001 | 1 |
| 0001 | 2 |
| 0002 | 3 |
| 0003 | 4 |
| 0004 | 1 |

IMAGE CAPTURE UNIT WITH CHANGEABLE IMAGE CAPTURE DIRECTION

CROSS-REFERENCE TO RELATED APPLICATION

The present application claims priority from Japanese Patent Application No. JP 2008-322306 filed in the Japanese Patent Office on Dec. 18, 2008, the entire content of which is incorporated herein by reference.

BACKGROUND OF THE INVENTION

1. Field of the Invention

The present invention relates to an image capture system having an image capture unit and a moving unit such as a platform and a method for image presentation performed by the image capture system. The present invention further relates to a program executed by an apparatus included in the image capture system.

2. Description of the Related Art

Japanese Unexamined Patent Application Publication No. 2001-268425 discloses the configuration of a remote-controlled platform system having a television camera as an automatic tracking device. That is, the platform system has a combination of an image capture apparatus and a platform.

SUMMARY OF THE INVENTION

While the present invention also relates to an image capture system that is configured to be capable of changing the image-capture direction of an image capture unit, it is desirable to provide an image capture system that is widely applicable for consumer use with improved usability.

In view of the situation, an embodiment of the present invention provides an image capture system.

The image capture system includes: automatic photography controlling means for executing an automatic photography operation in response to a predetermined trigger to thereby obtain captured-image data from an image resulting from image capture performed by an image-capture section; a display section having a display screen section on which the image is displayed, the display screen section being provided so that a display direction thereof is different from a direction in which the image capture is performed by the image-capture section; a moving mechanism section having a mechanism for moving a movement unit so that the display direction is changed in conjunction with the image-capture direction, the movement unit having the image-capture section and the display screen section; captured-image display controlling means for executing display control on the display section so that the image of the captured-image data obtained by the automatic photography controlling means is displayed on the display screen section; and movement controlling means for controlling the moving mechanism section so as to move the movement unit so that the display direction is directed toward a subject person in a mode in which the image of the captured-image data is displayed on the display screen portion.

In this configuration, the image of the captured-image data obtained by the automatic photography operation is displayed on the display screen section. During the display operation, an operation is performed to direct the display direction of the display screen section toward a person (subject person) shown in the image of the captured-image data as a subject.

Thus, according to the present invention, the user who is a subject can see and check the image captured by the automatic photography while staying at substantially the same location without moving from the place where the user was present as a subject. This arrangement can offer, for example, improved usability.

BRIEF DESCRIPTION OF THE DRAWINGS

FIGS. 16A and 16B are schematic views illustrating an example of the operation of the image capture system, when the number of subjects is more than one, according to the third example of the shot-image presentation operation;

FIGS. 29A and 29B illustrate examples of the structures and contents of subject-specific individual-recognition information and in-image subject information in a fifth example of the shot-image presentation operation;

DESCRIPTION OF THE PREFERRED EMBODIMENTS

A best mode (hereinafter referred to as an "embodiment") for carrying out the present invention will be described below in the following sequence.

<1. Configuration of Image Capture System>
[1-1. Overall Configuration]
[1-2. Digital Still Camera]
[1-3. Platform]
<2. Shot-Image Presentation Operation (First Example)>
<3. Shot-Image Presentation Operation (Second Example)>
<4. Shot-Image Presentation Operation (Third Example)>
<5. Shot-Image Presentation Operation (Fourth Example)>
<6. Shot-Image Presentation Operation (Fifth Example)>
<7. Shot-Image Presentation Operation (Sixth Example)>
<8. Shot-Image Presentation Operation (Seventh Example)>
<9. Pan/Tilt Drive Speed Control>

<1. Configuration of Image Capture System>
[1-1. Overall Configuration]

An image capture system according to an embodiment of the present invention includes a digital still camera 1 and a platform 10 on which the digital still camera 1 is mounted.

Figure 1A:
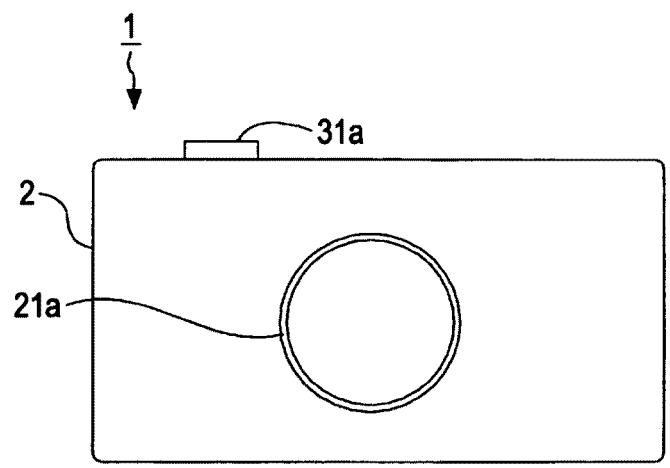
FIGS. 1A and 1B are a front view and a back view schematically illustrating the external appearance of a digital still camera serving as an image capture apparatus included in an image capture system according to an embodiment.
Figure 1B:
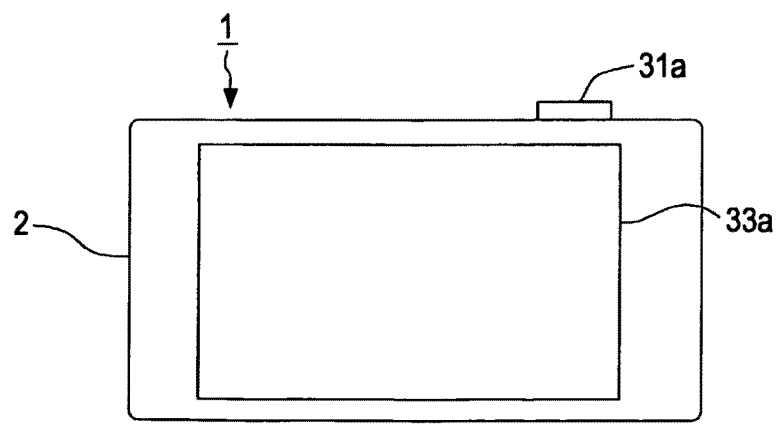

FIGS. 1A and 1B illustrate an example of the external appearance of the digital still camera 1. FIGS. 1A and 1B are a front view and a back view, respectively, of the digital still camera 1.

As illustrated in FIG. 1A, the digital still camera 1 has a lens section 21a disposed at a front side of a main unit 2. The lens section 21a protrudes outwardly from the main unit 2 to serve as an optical system for image capture.

A release button 31a is provided on the top surface of the main unit 2. In an image capture mode, an image captured by the lens section 21a (i.e., a captured image) is generated as an image signal. When the release button 31a is operated in an image-capture mode, the captured-image obtained during the operation is recorded to a storage medium as image data of a still image. That is, photography is performed.

As illustrated in FIG. 1B, the digital still camera 1 further has a display screen section 33a at its back side.

In the image capture mode, the display screen section 33a displays an image currently being captured by the lens section 21a. The image displayed in the image-capture mode is also referred to as a "live image" or the like. In a reproduction mode, image data recorded in the storage medium is reproduced and displayed. In addition, operation images that serve as a GUI (graphical user interface) are displayed in accordance with a user operation performed on the digital still camera 1.

The digital still camera 1 according to the embodiment has a touch panel that is combined with the display screen section 33a. Thus, the user can perform a desired operation by touching the display screen section 33a with his or her finger.

Although the image capture system according to the embodiment is described as being constituted by the digital still camera 1 and a platform 10 described below, the user can take a picture by using only the digital still camera 1, as with a typical digital still camera.

Figure 2:
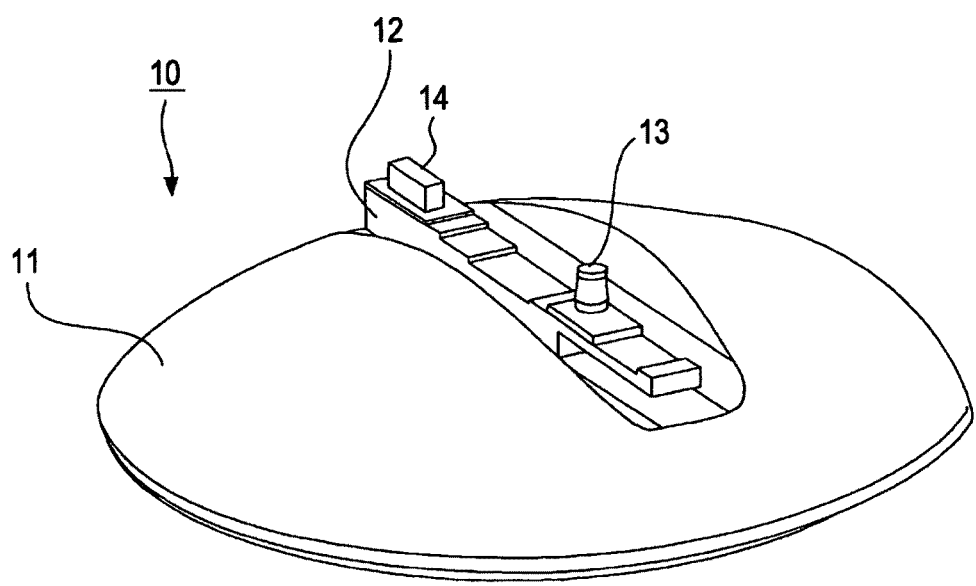
FIG. 2 is a perspective view illustrating an example of the external appearance of a platform included in the image capture system according to the embodiment.
Figure 3:
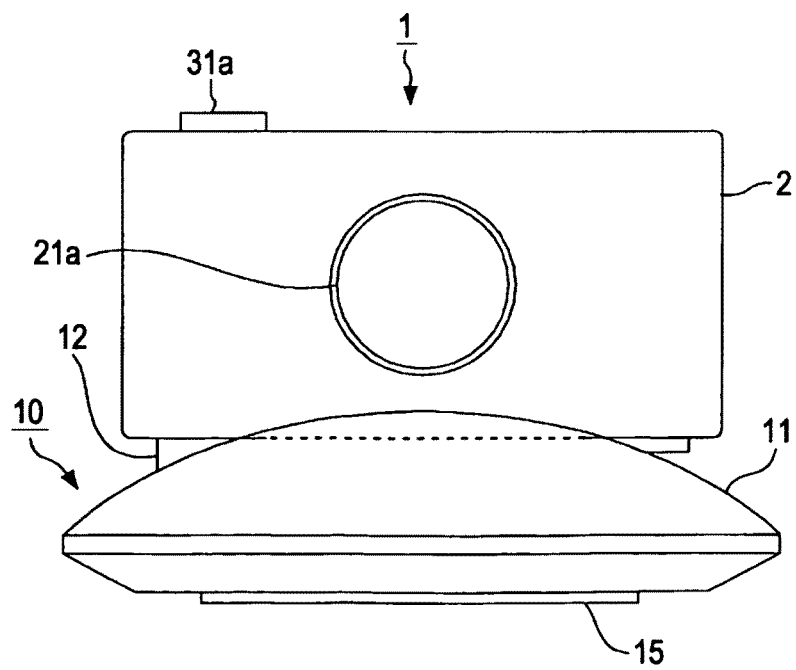
FIG. 3 is a front view illustrating, as the image capture system according to the embodiment, an example in which the digital still camera is mounted on the platform.
Figure 4:
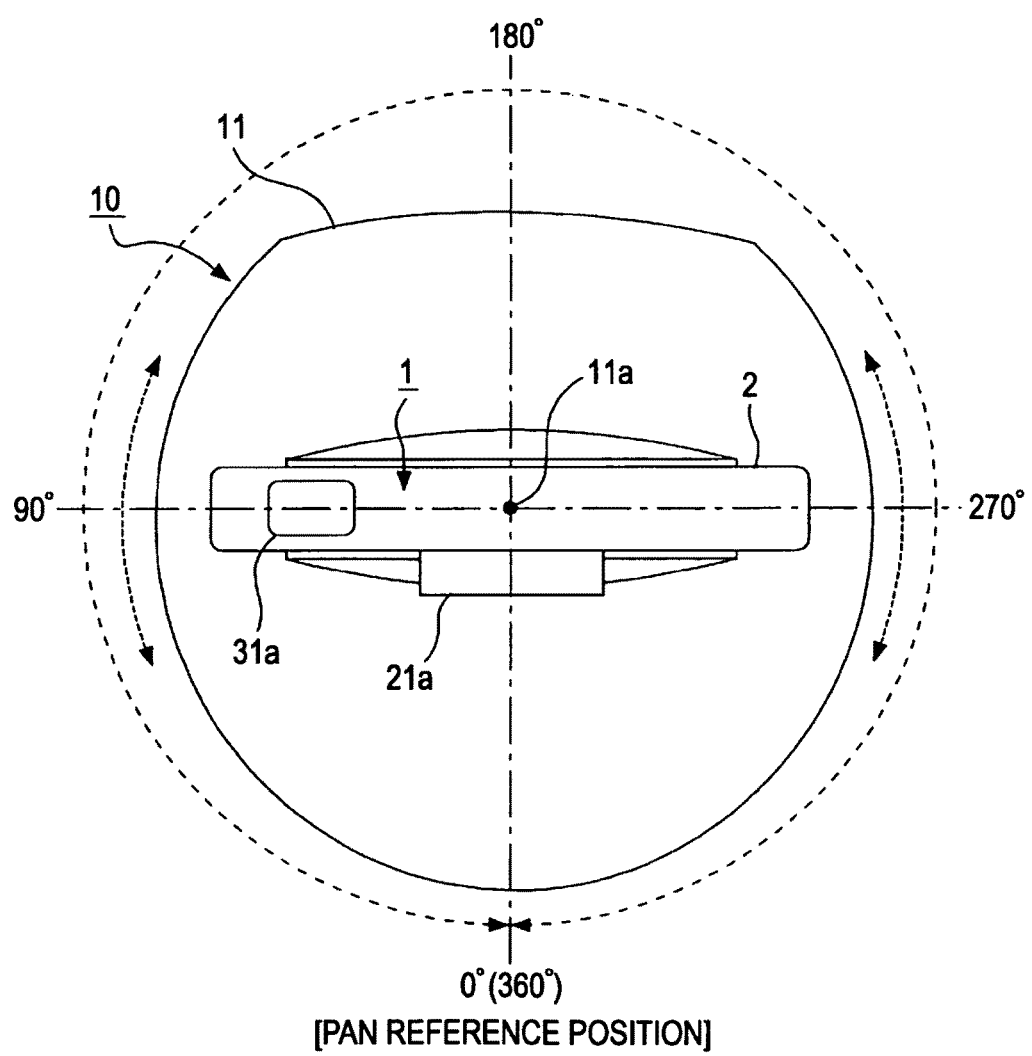
FIG. 4 is a top view illustrating, as the image capture system according to the embodiment, an example in which the digital still camera is mounted on the platform, in conjunction with an example of movement in a pan direction.
Figure 5:
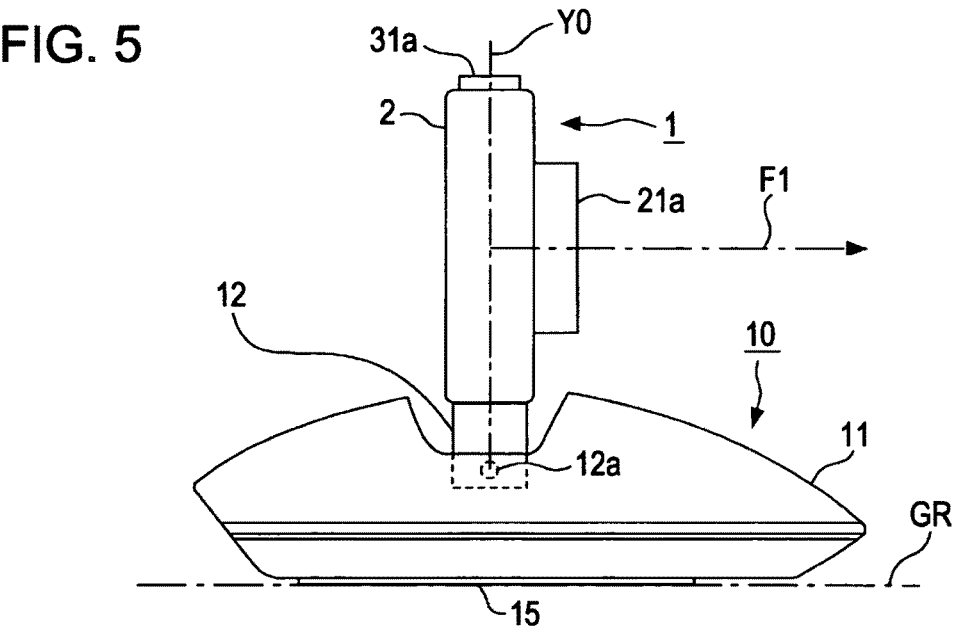
FIG. 5 is a side view illustrating, as the image capture system according to the embodiment, an example in which the digital still camera is mounted on the platform.
Figure 6:
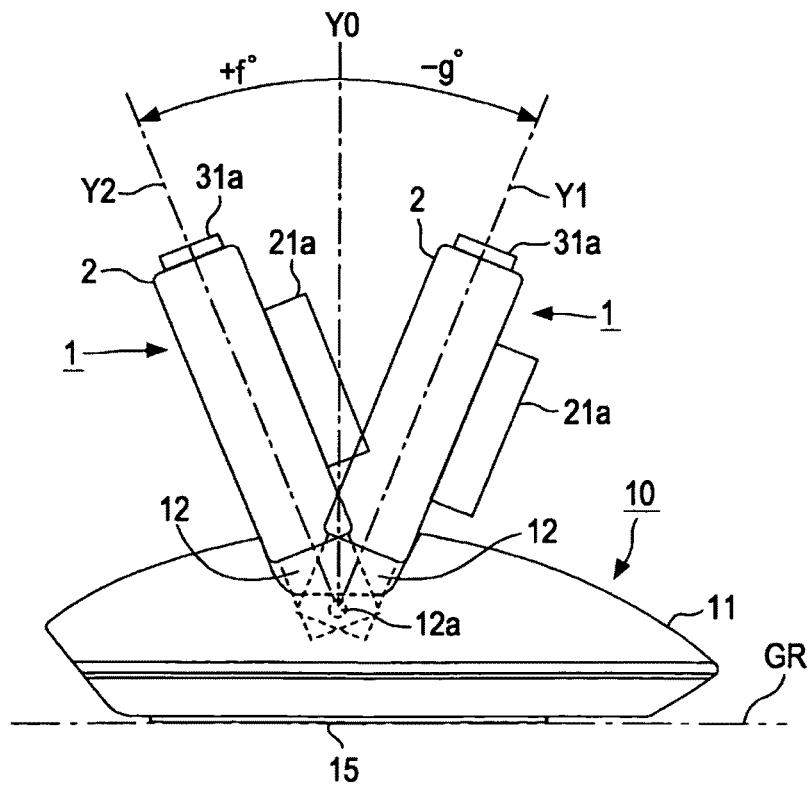
FIG. 6 is a side view illustrating an example in which the digital still camera is mounted on the platform, in conjunction with an example of movement in a tilt direction.

FIG. 2 is a perspective view of the platform 10. FIGS. 3 to 6 are external views of the image capture system in which the digital still camera 1 is appropriately mounted on the platform 10 according to the embodiment. FIGS. 3, 4, and 5 are a front view, a top view, and a side view, respectively, of the image capture system, and FIG. 6 is a side view illustrating a movable range of a tilt mechanism in the image capture system.

As illustrated in FIGS. 2, 3, 4, and 5, the platform generally has a structure in which a main body 11 is combined with a ground-contact base 15 and a camera mount portion 12 is attached to the main body 11.

For mounting of the digital still camera 1 on the platform 10, the bottom surface side of the digital still camera 1 is placed on the top surface side of the camera mount portion 12.

As illustrated in FIG. 2, a protruding portion 13 and a connector 14 are provided on the top surface portion of the camera mount portion 12.

Although not shown, a hole that engages with the protruding portion 13 is provided in the lower surface portion of the main unit 2 of the digital still camera 1. When the digital still camera 1 is appropriately placed on the camera mount portion 12, the hole and the protruding portion 13 engage with each other. The image capture system is configured so that, in the engaged state, the digital still camera 1 is not displaced or disengaged from the platform 10 during normal panning/tilting operation of the platform 10.

The digital still camera 1 also has a connector at a predetermined position of the lower surface portion thereof.

When the digital still camera 1 is appropriately placed on the camera mount portion 12, as described above, the connector of the digital still camera 1 and the connector 14 of the platform 10 are interconnected to allow at least mutual communication.

The communication between the digital still camera 1 and the camera mount portion 12 may be performed wirelessly.

For example, the image capture system may be configured so that, when the digital still camera 1 is mounted on the platform 10, the digital still camera 1 can be charged by the platform 10. In addition, the image capture system may also be configured so that a video signal of an image or the like being reproduced by the digital still camera 1 is transmitted to the platform 10 and the transmitted video signal is further output on an external monitor device through a cable, wireless communication, or the like. That is, the platform 10 may be provided with a function of the so-called "cradle", rather than being used for merely changing an image-capture viewing field of the digital still camera 1.

The term "image-capture viewing field" as used herein refers to a field of view defined by elements including an angle of view, a swing angle in a panning (horizontal) direction, an angle (an elevation/depression angle) in a tilt (vertical) direction with respect a range within the image frame of an image captured by the image capture apparatus in place.

Movement in pan and tilt directions of the digital still camera 1 on the platform 10 will now be described.

First, movement in the pan direction will be described.

When the platform 10 is placed on a floor or the like, the bottom surface of the ground-contact base 15 is in contact therewith. In this state, as illustrated in FIG. 4, the main body 11 can be rotated clockwise and anticlockwise about a rotation axis 11a. The image-capture viewing field of the digital still camera 1 mounted on the platform 10 changes along the left/right direction (horizontal direction). That is, the digital still camera 1 is panned.

In addition, the pan mechanism of the platform 10 has a structure that ensures a rotatable angle of 360°.

In the pan mechanism of the platform 10, a reference position in the pan direction is predetermined.

As illustrated in FIG. 4, the pan reference position is set at 0° (360°), and the rotation position of the main body 11 along the pan direction, i.e., a pan position of the main body 11, is expressed by 0° to 360°.

Movement in the tilt direction of the platform 10 will now be described.

As illustrated in FIGS. 5 and 6, movement in the tilt direction is given when the camera mount portion 12 is pivoted in either of elevation and depression angles with a rotation axis 12a of the camera mount portion 12 being used as the rotation axis.

FIG. 5 illustrates a state in which the camera mount portion 12 is located at a tilt reference position Y0. In this state, an image-capture direction F1 that matches the image-capture optical axis of the lens section 21a (the optical system) is parallel with a ground-contact surface portion GR with which the ground-contact base 15 is in contact.

As illustrated in FIG. 6, in the elevation-angle direction, the camera mount portion 12 can be moved about the rotation axis 12a in a range up to a predetermined maximum rotation angle +f°. In the depression angle direction, the camera mount portion 12 can also be moved about the rotation axis 12a in a range up to a predetermined maximum rotation angle −g°. Thus, the camera mount portion 12 is moved in a range of the maximum rotation angle +f° to the maximum rotation angle −g° relative to the tilt reference position Y0, so that the image-capture viewing field of the digital still camera 1 mounted on the platform 10 (the camera mount portion 12) changes in the up/down direction (vertical direction). That is, the digital still camera is tilted.

The external configuration of the platform 10 illustrated in FIGS. 2 to 6 is merely one example. Thus, the platform 10 may have any other physical configuration and structure that allow the mounted digital still camera 1 to be moved in the pan and tilt directions.

[1-2. Digital Still Camera]

Figure 7:
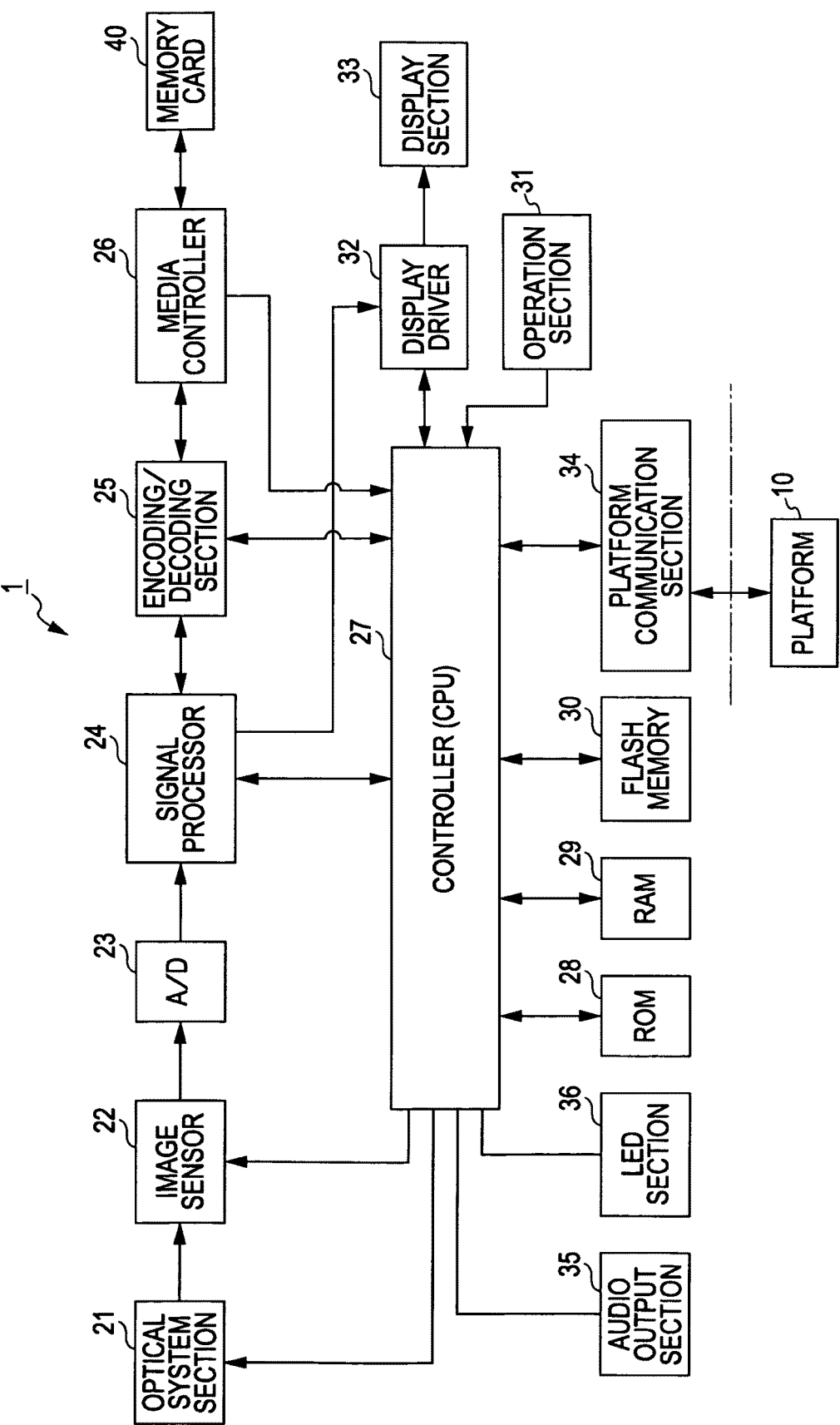
FIG. 7 is a block diagram illustrating an example of the configuration of the digital still camera.

FIG. 7 is a block diagram illustrating an example of the internal configuration of the digital still camera 1.

Referring to FIG. 7, an optical system section 21 has, for example, an aperture and a predetermined number of image-capture lenses, including a zoom lens, a focus lens, and so on. The optical system section 21 focuses incident light on a light-receiving surface of an image sensor 22 as captured-image light.

The optical system section 21 further has a drive mechanism section for driving the zoom lens, the focus lens, the aperture, and so on. Operation of the drive mechanism section is controlled by, for example, the so-called "camera control", such as zoom (filed angle) control, autofocus adjustment control, automatic exposure control, and so on, executed by a controller 27.

The image sensor 22 performs so-called "photoelectric conversion" for converting the captured-image light, obtained by the optical system section 21, into an electrical signal. Thus, in the image sensor 22, the light-receiving surface of photoelectric conversion elements receives the captured-image light output from the optical system section 21 and signal charge is stored in accordance with the strength of the received light and is sequentially output at predetermined timing. Consequently, the image sensor 22 outputs an electrical signal (a captured-image signal) corresponding to the captured-image light. Examples of the photoelectric conversion elements (image capture elements) used for the image sensor 22 include, but are not particularly limited to, a CMOS (complementary metal oxide semiconductor) sensor and a CCD (charge coupled device). When a CMOS sensor is used, a device (component) corresponding to the image sensor 22 may have an analog-to-digital convertor corresponding to an analog-to-digital (A/D) converter 23 described below.

The captured-image signal output from the image sensor 22 is input to the A/D converter 23 and is thereby converted into a digital signal, which is then input to a signal processor 24.

The signal processor 24 may receive the digital captured-image signal, output from the A/D converter 23, for example, for each still image (a frame image). By performing predetermined signal processing on the received captured-image signal for each still image, the signal processor 24 can generate captured-image data (captured still-image data), which is pixel signal data corresponding to one still image.

When the image-captured data thus generated by the signal processor 24 is to be recorded to a memory card 40 (which is a storage medium or a storage medium device) as image information, for example, captured-image data for one still image is output from the signal processor 24 to an encoding/decoding section 25.

The encoding/decoding section 25 executes compression encoding, which is based on a predetermined still-image compression coding system, on the still-image captured-image data output from the signal processor 24. Further, for example, under the control of the controller 27, the encoding/decoding section 25 adds a header and so to the encoded data and converts the resulting data into image data compressed in a predetermined format. The encoding/decoding section 25 then transfers the thus-generated image data to a media controller 26. Under the control of the controller 27, the media controller 26 causes the transferred image data to be written and recorded to the memory card 40. The memory card 40 in this case is, for example, a storage medium having a card shape that complies with a predetermined standard and having therein a nonvolatile semiconductor storage element, such as a flash memory. The type and the shape of the storage medium for storing the image data may be different from those of the above-described memory card.

The signal processor 24 according to the present embodiment uses captured-image data, obtained as described above, to execute image processing for detecting a subject or subjects, as described below.

The digital still camera 1 uses the captured-image data obtained by the signal processor 24 and causes a display section 33 to execute image display. In this processing, the digital still camera 1 can display the so-called "live image", which is an image currently being captured. For example, by repeating the above-described operation of receiving the captured-image signal output from the A/D converter 23 and generating captured-image data corresponding to one still image, the signal processor 24 can sequentially generate captured-image data corresponding to frame images in a moving image. Under the control of the controller 27, the signal processor 24 transfers the captured-image data, sequentially generated as described above, to a display driver 32. Consequently, live images can be displayed.

The display driver 32 generates a drive signal for driving the display section 33 on the basis of the captured-image data input from the signal processor 24, as described above, and outputs the drive signal to the display section 33. Consequently, the display section 33 sequentially displays images based on the captured-image data for respective still images. When this operation is viewed from the viewpoint of a user, images currently being captured are displayed on the display section 33 in the form of a moving image. Thus, live images are displayed.

The digital still camera 1 can also reproduce image data recorded in the memory card 40 and can display the resulting image on the display section 33.

For this purpose, the controller 27 specifies image data and issues an instruction to the media controller 26 so as to read the image data from the memory card 40. In response to the instruction, the media controller 26 accesses an address at which the specified image data is recorded, the address being located in the memory card 40, to read the image data, and transfers the read image data to the encoding/decoding section 25.

For example, under the control of the controller 27, the encoding/decoding section 25 extracts substantial data (which is compressed still-image data) from the captured-image data transferred from the media controller 26 and executes decoding processing, which corresponds to the above-described compression encoding, on the extracted compressed still-image data to obtain captured-image data for one still image. The encoding/decoding section 25 transfers the captured-image data to the display driver 32. The display section 33 then displays a reproduced image of the captured-image data recorded in the memory card 40.

The display section 33 can also display user-interface images (operation images) as well as the live images, reproduced images of image data, and so on. In this case, for example, in accordance with the current state of operation, the controller 27 generates image data for display as user-interface images and outputs the image data to the display driver 32. Consequently, the display section 33 displays the user-interface images. The user-interface image can also be displayed on a display screen of the display section 33 independently from a monitor image or reproduced image of captured-image data, for example, on a specific menu screen or the like. The user-interface images can also be displayed superimposed on or combined with a part on a monitor image or the reproduced image of captured-image data.

In practice, the controller 27 has, for example, a CPU (central processing unit) and constitutes a microcomputer in conjunction with a ROM (read only memory) 28, a RAM (random access memory) 29, and so on. The ROM 28 stores, for example, a program to be executed by the CPU of the controller 27 and various types of setting information associated with the operation of the digital still camera 1. The RAM 29 serves as a main storage device for the CPU.

A flash memory 30 in this case is provided to serve as a nonvolatile storage area used for storing, for example, various types of setting information that have to be changed (e.g., overwriting) in accordance with a user operation, operation history, and so on. When the ROM 28 is implemented with a nonvolatile memory such as a flash memory, a storage area in the ROM 28 may be used instead of the flash memory 30.

An operation section 31 generally includes various operation elements provided on the digital still camera 1 and an operation-information-signal output section for generating an operation-information signal corresponding to a user operation performed on the operation element(s) and outputting the generated operation-information signal to the CPU. The controller 27 executes predetermined processing in accordance with the operation information signal input from the operation section 31. As a result of the processing, the digital still camera 1 performs an operation corresponding to the user operation.

A platform communication section 34 executes communication between the digital still camera 1 and the platform 10 in accordance with a predetermined communication system. For example, the platform communication section 34 has a physical layer configuration for allowing a communication signal to be transmitted to or received from a communication section of the platform 10 in a wired or wireless manner when the digital still camera 1 is mounted on the platform 10 and also a configuration for realizing communication processing for a predetermined layer that is higher than the physical layer. The physical-layer configuration includes the connector connected to the connector 14 in the configuration illustrated in FIG. 2.

[1-3. Platform]

Figure 8:
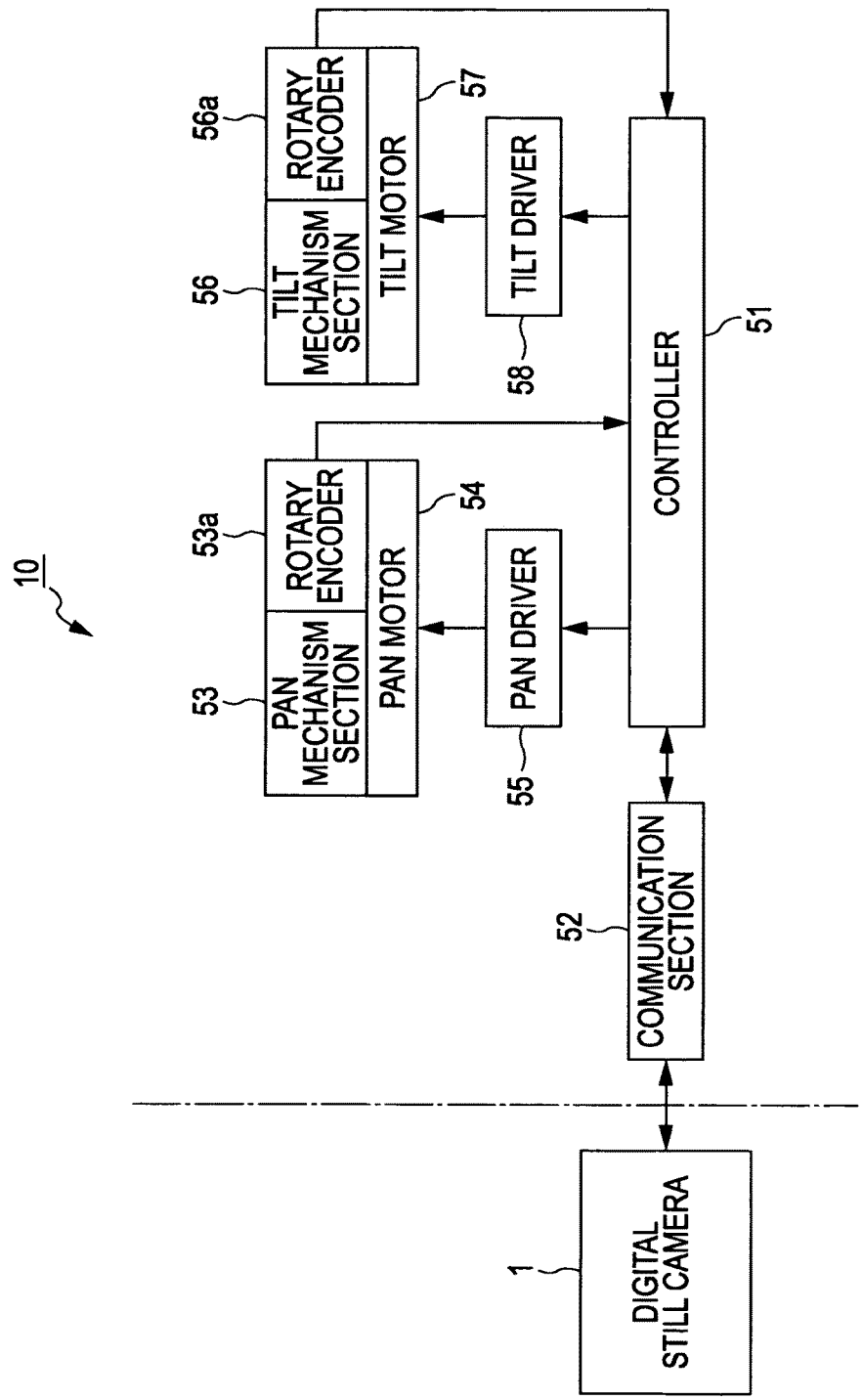
FIG. 8 is a block diagram illustrating an example of the configuration of the platform.

FIG. 8 is a block diagram illustrating an example of the internal configuration of the platform 10.

As described above, the platform 10 has pan and tilt mechanisms. As sections corresponding to the pan and tilt mechanisms, the platform 10 has a pan mechanism section 53, a pan motor 54, a tilt mechanism section 56, and a tilt motor 57.

The pan mechanism section 53 has a mechanism for moving the digital still camera 1, mounted on the platform 10, in the pan (horizontal, leftward-and-rightward) direction illustrated in FIG. 4. The movement of this mechanism is provided by forward/backward rotation of the pan motor 54. Similarly, the tilt mechanism section 56 has a mechanism for moving the digital still camera 1, mounted on the platform 10, in the tilt (vertical, upward-and-downward) direction illustrated in FIG. 6. The movement of this mechanism is provided by forward/backward rotation of the tilt motor 57.

A controller 51 has a microcomputer configured by a combination of, for example, a CPU, a ROM, and a RAM, and controls the operations of the pan mechanism section 53 and the tilt mechanism section 56. For example, during control of the operation of the pan mechanism section 53, the controller outputs, to a pan driver 55, a signal indicating a direction for movement and a movement speed. The pan driver 55 generates a motor drive signal corresponding to the input signal and outputs the motor drive signal to the pan motor 54. For example, when the motor is a stepping motor, the motor drive signal is a pulsed signal for PWM (pulse width modulation) control.

In accordance with the motor drive signal, the pan motor 54 is rotated, for example, in a predetermined rotation direction and at a predetermined rotation speed. As a result, the pan mechanism section 53 is also driven so as to operate in a movement direction and at a movement speed corresponding to the rotation direction and the rotation speed.

Similarly, for controlling the operation of the tilt mechanism section 56, the controller 51 outputs, to a tilt driver 58, a signal indicating a movement direction and a movement speed for the tilt mechanism section 56. The tilt driver 58 generates a motor drive signal corresponding to the input signal and outputs the motor drive signal to the tilt motor 57. In accordance with the motor drive signal, the tilt motor 57 is rotated, for example, in a predetermined rotation direction and at a predetermined rotation speed. As a result, the tilt mechanism section 56 is also driven so as to operate in a movement direction and at a movement speed corresponding to the rotation direction and the rotation speed.

The pan mechanism section 53 has a rotary encoder (rotary detector) 53a. In accordance with the motion of rotation of the pan mechanism section 53, the rotary encoder 53a outputs a detection signal indicating the amount of the rotation angle to the controller 51. Similarly, the tilt mechanism section 56 has a rotary encoder 56a. In accordance with the motion of rotation of the tilt mechanism section 56, the rotary encoder 56a also outputs a detection signal indicating the amount of the rotation angle to the controller 51.

In accordance with a predetermined communication system, a communication section 52 executes communication with the platform communication section 34 in the digital still camera 1 mounted on the platform 10. Similarly to the platform communication section 34 in the digital still camera 1, the communication section 52 has a physical layer configuration for allowing a communication signal to be transmitted to or received from the platform communication section 34 in a wired or wireless manner and a configuration for realizing communication processing for a predetermined layer that is higher than the physical layer. The physical layer configuration includes the connector 14 of the camera mount portion 12 illustrated in FIG. 2.

<2. Shot-Image Presentation Operation (First Example)>

The digital still camera 1 according to the present embodiment is capable of performing automatic photography (typified by, e.g., self-timer photography), in which photography is executed without a photographer directly performing a release operation. The "photography" as used herein refers to obtaining image data for, for example, image data for a picture, from captured-image data obtained as a result of image capture performed by the optical system section 21 and the image sensor 22 and signal processing performed by the signal processor 24. An image or image data resulting from such photography (i.e., a captured image or captured-image data) is referred to as a "shot image".

In addition, the image capture system (including the digital still camera 1 and the platform 10) according to the present embodiment having the above-described configuration executes a shot-image presentation operation for displaying a captured image, obtained by the automatic photography, toward a subject person after execution of the automatic photography.

First, a first example of the shot-image presentation operation according to the present embodiment will be described with reference to FIGS. 9A to 11B. The first example is a basic example for the shot-image presentation operation according to the present embodiment.

Figure 9A:
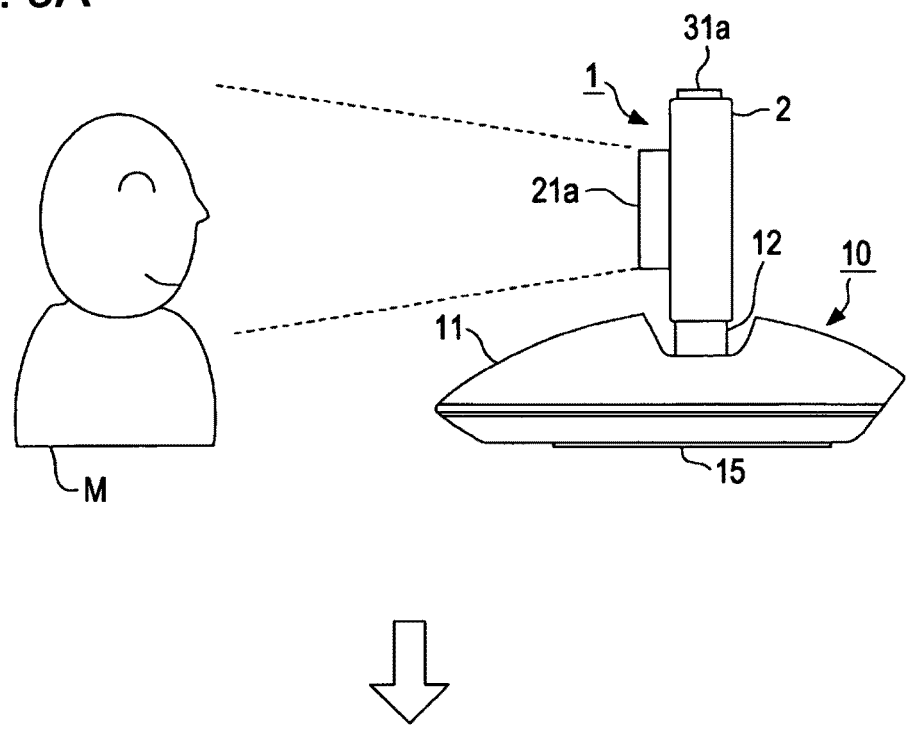
FIGS. 9A and 9B are schematic views illustrating an example of the operation of the image capture system according to a first example of a shot-image presentation operation.
Figure 10A:
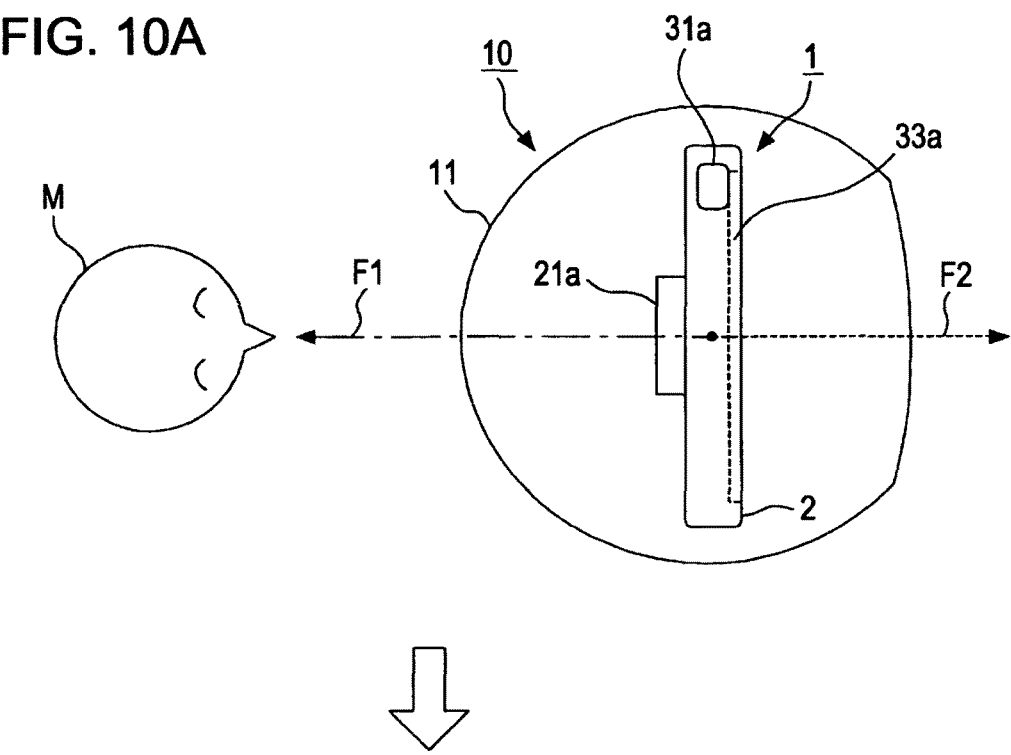
FIGS. 10A and 10B are schematic views illustrating an example of the operation of the image capture system according to the first example of the shot-image presentation operation.
Figure 11A:
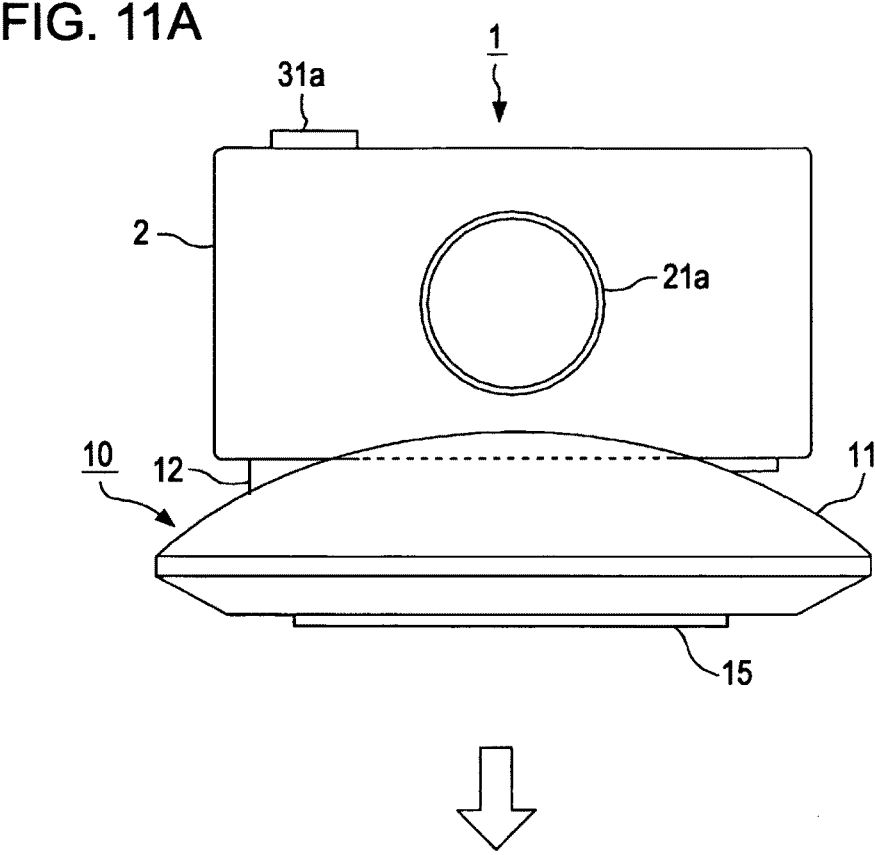
FIGS. 11A and 11B are schematic views illustrating an example of the operation of the image capture system according to the first example of the shot-image presentation operation.

FIG. 9A is a side view schematically showing a case in which the image capture system according to the present embodiment executes automatic photography on one subject person M as a subject. FIG. 10A is a top view schematically showing the case in which the automatic photography illustrated in FIG. 9A is executed. FIG. 11A is a view showing a state of the image capture system when the automatic photography in FIG. 9A is executed, the state being viewed from the viewpoint of the subject person M.

A typical example of a mode of the automatic photography is the so-called "self-timer photography". That is, when the user performs an operation for starting a self-timer, a photography operation is automatically executed in response to a trigger indicating that the amount of preset timer time has passed from the time of the operation.

As one mode of the automatic photography, the image capture system according to the embodiment can have a configuration that automatically determines image composition while tracking a subject and that executes photography in response to trigger indicating that a determination result showing that the determined image composition is obtained. Such automatic image-composition control photography is also one mode of the automatic photography.

In the first example, for convenience and ease of description, the automatic photography is assumed to be self-timer photography.

When the subject person M causes the image capture system according to the embodiment to execute automatic photography on himself or herself, he or she maintains a positional relationship with the digital still camera 1 so that he or she fits in the image-capture viewing field of the digital still camera 1, as illustrated in FIGS. 9A and 10A. In this state, the subject person M substantially faces the front surface portion of the main unit 2, which has the lens section 21a of the digital still camera 1.

In FIG. 10A, F1 indicates an image-capture direction that matches a straight axis (indicated by a dashed-dotted line) that matches the optical axis of the lens section 21a (in the optical system section) and that extends forward from the digital still camera 1. In this case, the subject person M is in a state exactly facing in the image-capture direction F1.

Similarly, in FIG. 10A, F2 indicates a display direction (denoted by a dotted line) that is perpendicular to the surface direction of the display screen section 33a and that extends backward from the digital still camera 1.

Figure 10B:
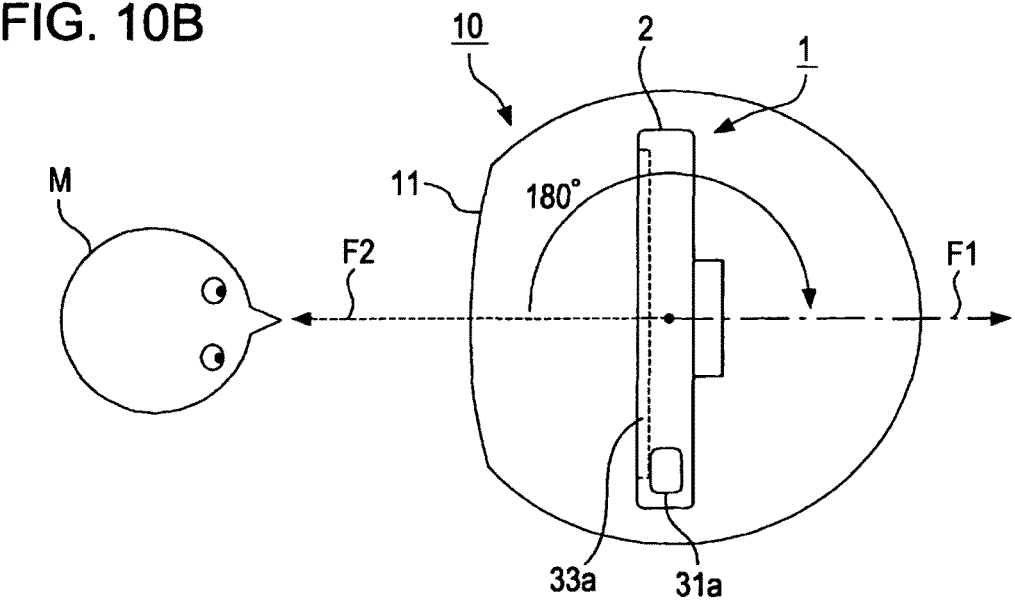

Next, when the operation of the self-timer photography performed by the digital still camera 1 is completed in the state illustrated in FIGS. 9A, 10A, and 11A, the pan mechanism of the platform 10 in the first example is rotated and moved by 180°, for example, as illustrated in FIG. 10B. Although a state in which the pan mechanism is rotated and moved clockwise by 180° is illustrated, the pan mechanism may be rotated and moved anticlockwise.

Figure 9B:
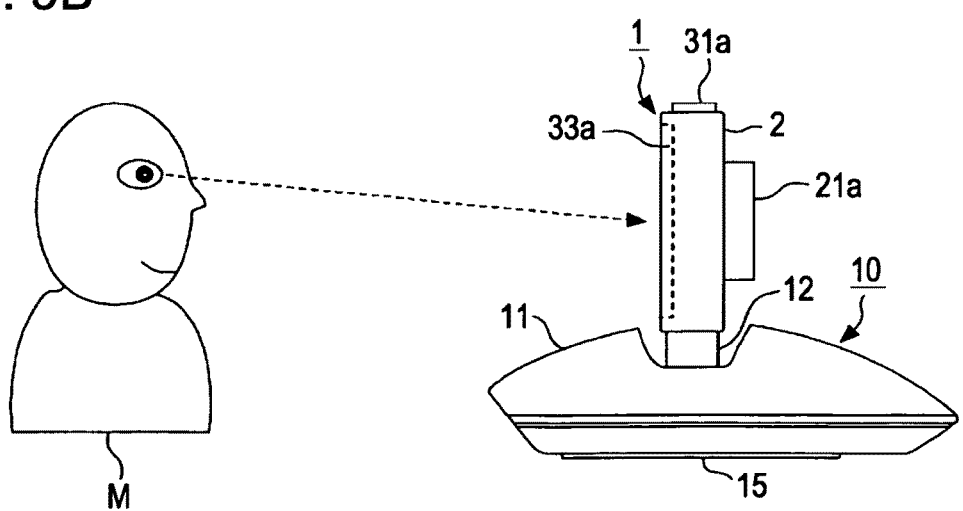
Figure 11B:
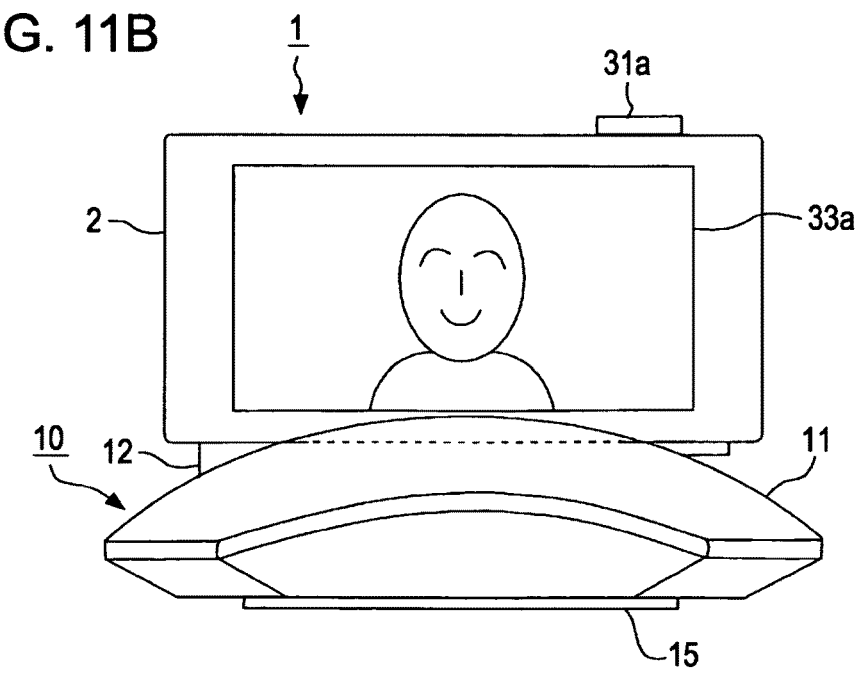

As a result of such an operation of the platform 10, the display screen section 33a of the digital still camera 1 is directed in the direction in which the subject person M is viewing, as illustrated in FIGS. 9B, 10B, and 11B. When this state is expressed as the relationship of the subject person M, the image-capture direction F1, and the display direction F2, the display direction F2 faces the subject person M1 and the image-capture direction F1 is directed opposite to the subject person M, as can be seen from FIG. 10B.

As illustrated in FIG. 11B, the display screen section 33a at this point displays a reproduced shot image obtained by the self-timer photography executed in the state illustrated in FIGS. 9A and 10A.

Thus, the subject person M can see and check the shot image obtained by the self-timer photography.

Typically, during automatic photography using digital still cameras, people do not hold the digital still cameras in many cases during the operations. Thus, when a person who was photographed as a subject (i.e., a subject person) wishes to check how he or she appears in a shot image displayed on the display section of the digital still camera immediately after the completion of the self-timer photography, it is typically necessary for the person to go to the digital still camera to see the shot image.

In contrast, the above-described shot-image presentation operation according to the present embodiment makes it possible for the subject person to check the shot image while staying at the same position where the self-timer photography is performed. Thus, this arrangement can enhance usability.

In addition, the motion of the platform 10, when it is actually seen, is pretty interesting. That is, the image capture system is more entertaining.

Figure 12:
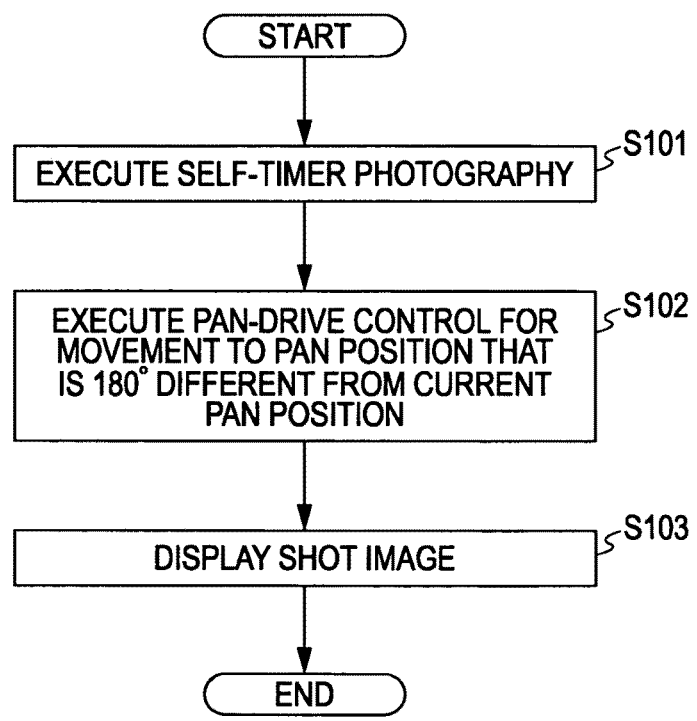
FIG. 12 is a flowchart illustrating an example of a processing procedure for reversal-drive control in the first example of the shot-image presentation operation.

FIG. 12 is a flowchart illustrating an example of a processing procedure, executed by the image capture system, for the shot-image presentation operation in the first example described above. More specifically, the processing in FIG. 12 can be regarded as control and processing, executed by the controller 27 (CPU) in the digital still camera 1 in accordance with a program, for the shot-image presentation operation.

First, in step S101 in FIG. 12, the controller 27 executes self-timer photography. That is, for example, the controller 27 starts a timer for an amount of preset self-timer time to start timekeeping, and then generates still-image data of captured image obtained when the amount of self-timer time passes. The generated still-image data becomes image data (shot-image data) for a shot image. In the first example, in step S101, the generated shot-image data is written and stored into the memory card 40.

In conjunction with the processing in step S101, in step S102, the controller 27 executes, as pan control for the platform 10, drive control for moving the pan mechanism section 53 to a pan position that is 180° different from the current pan position.

In order to execute the drive control, the controller 27 communicates with the platform 10 via the platform communication section 34 to output, to the platform 10, an instruction for rotating and moving the pan mechanism section 53 clockwise (or anticlockwise).

In response to the instruction, the controller 51 in the platform 10 controls the pan driver 55 so that the pan motor 54 is driven in a rotation direction corresponding to the clockwise (or anticlockwise) movement of the pan mechanism section 53. Consequently, a panning operation of the platform 10 is started.

In response to the movement of the pan mechanism section 53, the controller 51 receives the above-described detection signal indicating the amount of rotation angle, the detection signal being output from the rotary encoder 53a. The controller 51 transmits the detection signal, output from the rotary encoder 53a, to the digital still camera 1 through communication via the communication section 52.

In this case, on the basis of the detection signal output from the rotary encoder 53a, the controller 27 in the digital still camera 1 can constantly recognize the pan position of the pan mechanism section 53, the pan position changing in accordance with the movement of the pan mechanism section 53.

When the pan mechanism section 53 is located at the pan reference position, the controller 27 can recognize so, for example, through communication with the platform 10. In this case, the controller 27 has information indicating that the current pan position is at 0°.

Thereafter, in response to rotation caused by driving of the pan mechanism section 53 in the platform 10, the controller 27 receives the detection signal output from the rotary encoder 53a. The controller 27 determines the amount of rotation angle of the pan mechanism section 53 on the basis of the detection signal and determines information of a new current pan position on the basis of the determined amount of rotation angle. In such a manner, the controller 27 in the digital still camera 1 can constantly recognize the pan position at the platform 10.

In step S102, the controller 27 starts driving of the pan mechanism section 53, as described above, and then waits until the pan position of the pan mechanism section 53 moves to a target pan position (expressed by x°+180°), which is rotated by 180° from a pan position (expressed by x°) obtained during the self-timer photography. Upon recognizing that the pan position of the pan mechanism section 53 moves to the target pan position, the controller 27 outputs, to the platform 10, an instruction for stopping the drive of the pan mechanism section 53.

In response to the drive-stopping instruction, the controller 51 in the platform 10 controls the pan driver 55 so as to stop the rotation of the pan motor 54. As a result, the panning operation of the platform 10 is stopped. As a result of the above-described processing and operation corresponding to step S102, the platform 10 provides a state in which the pan mechanism section 53 is panned by 180° rotation after the execution of the self-timer photography, as described above with reference to FIGS. 9A to 11B.

In step S103, by using the shot-image data obtained as a result of the self-timer photography executed in step S101, the controller 27 executes display control so that the display section 33 reproduces and displays a shot image. Consequently, as illustrated in FIG. 11B, a shot image is displayed on the display screen section 33a of the digital still camera 1.

As described above, the display direction F2 is directed toward the subject person M through the movement in the pan direction. This is because the pan mechanism section in the platform 10 in the present embodiment is given a movable range in which the display direction F2 can be substantially reversed. Thus, for example, if the tilt mechanism section is given a sufficient movable range, the platform 10 may be configured so that the display direction F2 is directed toward the subject person M through movement in the tilt direction. In such a state, however, an image displayed on the display screen section 33a is seen upside down by the subject person M. Thus, the captured image is rotated by 180° for display.

The reason why the pan mechanism section 53 is rotated by 180° in the pan direction in the above description is that the image-capture direction F1 and the display direction F2 have a relationship of 180° mutually.

Thus, for example, when the angle defined by the image-capture direction F1 and the display direction F2 is an angle (Δx°) other than 180° due to the installation positions of the lens section 21a and the display screen section 33a of the digital still camera 1, pan drive control may be performed so that the target pan position becomes a position expressed by x°+Δx°, where x° indicates the pan position during automatic photography.

<3. Shot-Image Presentation Operation (Second Example)

A second example of the shot-image presentation operation performed by the image capture system according to the present embodiment will now be described with reference to FIGS. 13A and 13B.

Figure 13A:
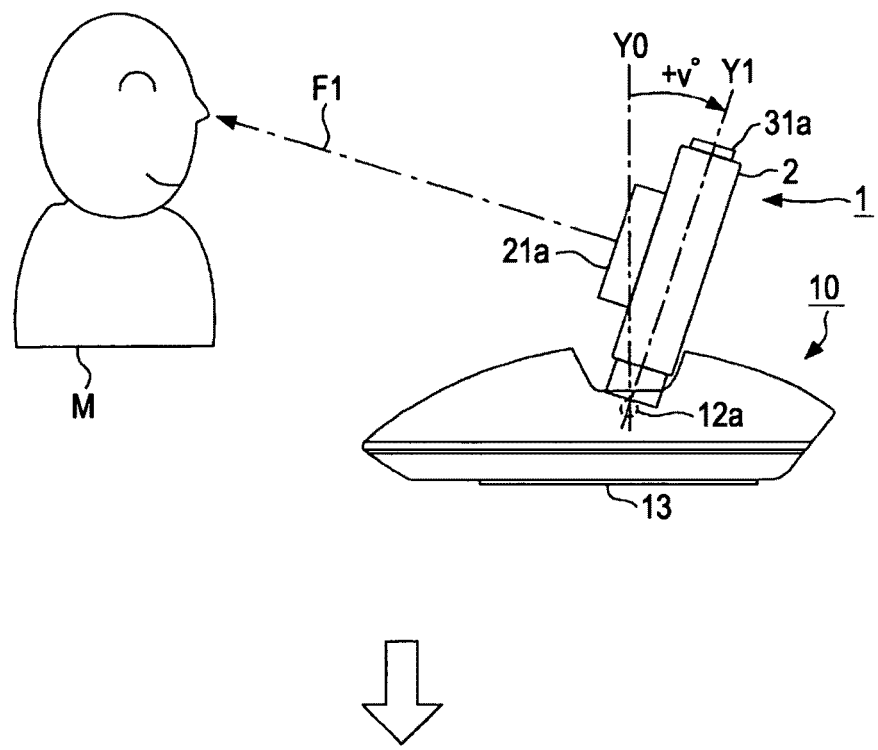
FIGS. 13A and 13B are schematic views illustrating an example of the operation of the image capture system according to a second example of the shot-image presentation operation.

FIG. 13A is a side view schematically showing a case in which the image capture system according to the present embodiment executes automatic photography on a subject person M as a subject. In the second example, the automatic photography is also assumed to be self-timer photography.

In the case illustrated in FIG. 13A, with respect to the pan direction, the subject person M is in a positional relationship in which he or she fits in the image-capture viewing field of the digital still camera 1, as in the case of FIG. 9A in the first example.

In addition, in the case of FIG. 13A, the subject person M is present above the image capture system. Accordingly, adjustment is performed in the tilt direction so that the subject person M fits in the image-capture viewing field of the digital still camera 1.

Since the image capture system according to the present embodiment has the platform 10, the image-capture direction can be changed through execution of the pan drive and tilt drive in accordance with a user operation (e.g., a remote control operation) or the like. The adjustment in the tilt direction can be performed by, for example, such a user operation.

As a result of adjustment in the tilt direction in the manner described above, the tilt mechanism section 56 is located at a tilt position Y1 located at a angle obtained by +v° rotation from the tilt reference position Y0. Correspondingly, the digital still camera 1 is given an elevation angle corresponding to the tilt position Y1, so that the front surface portion of the main unit 2 is directed upward as illustrated in FIG. 13A. In this state, the image-capture direction F1 is directed almost exactly toward the subject person M.

In the second example, it is now assumed that self-timer photography is executed.

Figure 13B:
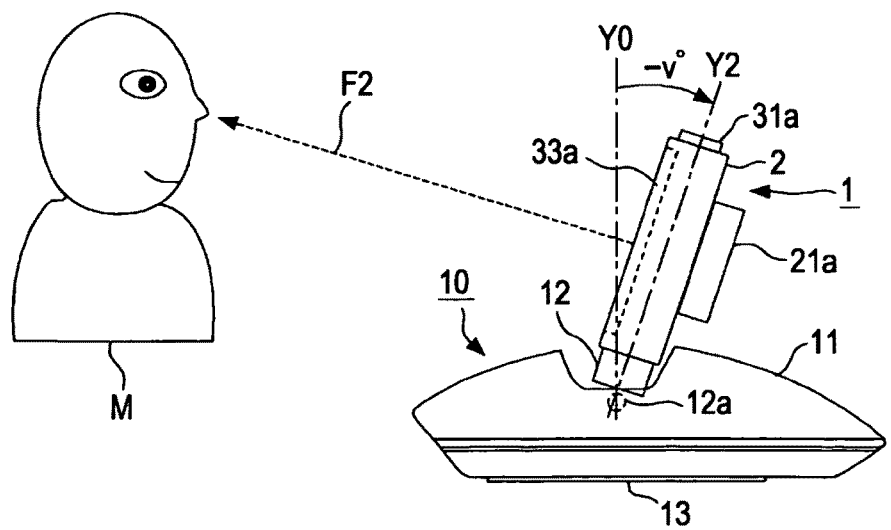

In response, as illustrated in FIG. 13B, first, the pan mechanism section 53 first moves to a position at 180° relative to a previous pan position.

In addition, in the second example, in conjunction with the panning operation, a tilting operation is performed in the following manner.

That is, as illustrated in FIG. 13B, the tilt mechanism section 56 is moved from the tilt reference position Y0 to a tilt position Y2 located at a rotation angle of −v°. That is, the digital still camera 1 is given a tilt with the same amount of angle as and in a direction opposite to those during the self-timer photography.

Thus, during the self-timer photography illustrated in FIG. 13A, the front surface portion of the digital still camera 1 is directed upward relative to the tilt reference position Y0 by an amount corresponding to the amount of angle v (absolute value). In contrast, during the captured-image presentation illustrated in FIG. 13B, the front surface portion of the digital still camera 1 is directed downward relative to the tilt reference position Y0 by an amount corresponding to the amount of angle v (absolute value). With this arrangement, even when the subject person M is present above the image capture system, the display direction F2 can be appropriately directed toward the subject person M so as to correspond to the upward position.

If only 180° panning is executed in the state illustrated in FIG. 13A as pan/tilt drive for displaying a shot image, the back surface portion of the digital still camera 1 is directed downward by v° when viewed from the subject person M. In this state, it is pretty difficult for the subject person M to view the display screen section 33a, since it is directed considerably downward.

In order to solve the difficulty in viewing, for example, an approach in which the tilt position is returned to the tilt reference position Y0 so that the display direction F2 is horizontal is conceivable. In this case, however, since the image capture system 1 is located below the eyes of the subject person M, it may be difficult to view the display screen section 33a even when the display direction F2 is horizontal.

Accordingly, in the second example, the arrangement is such that an angle value that is inverted from that during the self-timer photography is given to the tilt position, so as to make it easier for the subject person M to see an image displayed on the display screen section 33a.

In the example illustrated in FIG. 13A, the tilt position is located at a rotation angle in the elevation-angle direction during the self-timer photography. As opposed to the example illustrated in FIG. 13A, if self-timer photography is performed at a tilt position with a rotation angle in the depression-angle direction, tilting is performed during display of a shot image so that a tilt position that is obtained by rotation in the elevation-angle direction by the same amount of angle is given.

Figure 14:
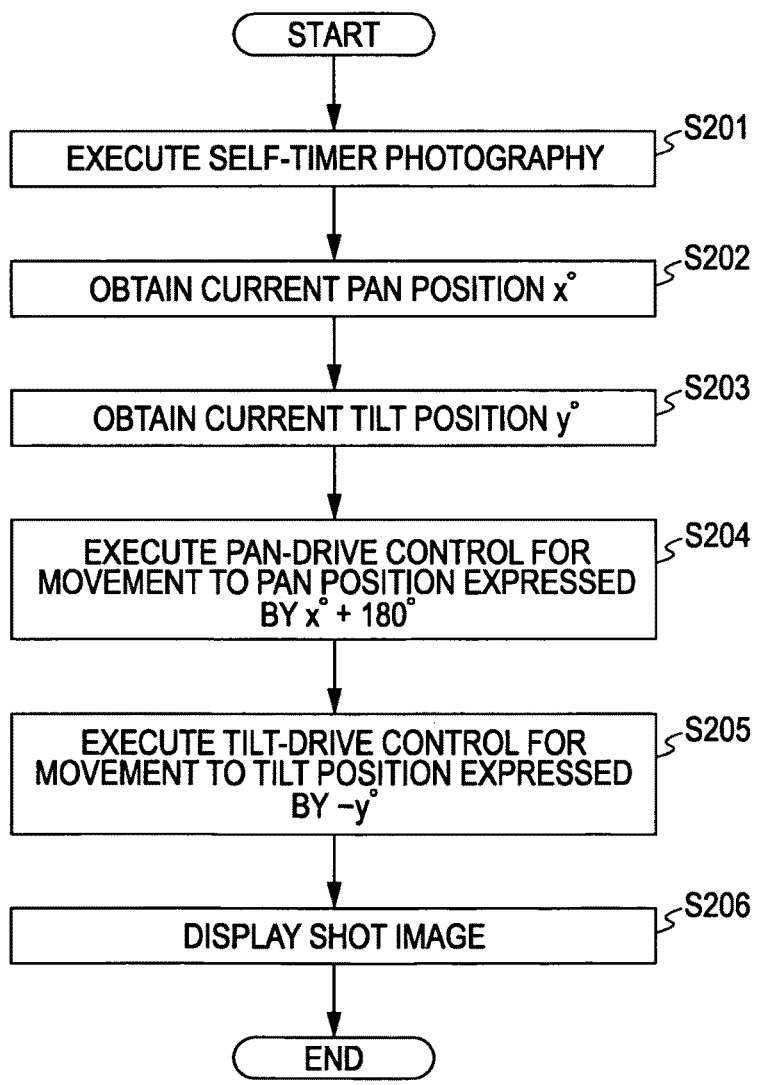
FIG. 14 is a flowchart illustrating an example of a processing procedure for reversal-drive control in the second example of the shot-image presentation operation.

FIG. 14 is a flowchart illustrating control and processing, executed by the image capture system, for the shot-image presentation operation in the second example. More specifically, the controller 27 (CPU) in the digital still camera 1 executes the control and processing for the shot-image presentation operation in accordance with a program.

First, in step S201 in FIG. 14, the controller 27 executes self-timer photography, as in step S101 illustrated in FIG. 12.

Next, in steps S202 and S203, the controller 27 obtains the current pan position x° and the current tilt position y°, respectively. At this stage, panning and tilting after the self-timer photography have not been performed yet. Thus, the current pan position x° and the current tilt position y° obtained in steps S202 and S203, respectively, correspond to a pan position and a tilt position obtained during the self-timer photography.

The pan position x° takes a range of 0° to 360°, where the pan reference position illustrated in FIG. 4 is at 0° (360°.

The tilt position y° takes a range of 0° to +f° in the elevation-angle direction and takes a range of 0° to −g°in the depression-angle direction, where the tilt reference position Y0 illustrated in FIGS. 5 and 6 is at 0°.

As described above in connection with step S102 illustrated in FIG. 12, the controller 27 constantly holds information of the pan position x° on the basis of the detection signal output from the rotary encoder 53a of the pan mechanism section 53. Thus, the held information may be used as the pan position x° in step S202.

In the same manner as the pan position x°, the controller 27 constantly recognizes the tilt position y° on the basis of the detection signal output from the rotary encoder 56a in the tilt mechanism section 56 and holds the information of the tilt position y°.

In step S203, the controller 27 may read the tilt position information, held as described above, to obtain the tilt position y°.

In step S204, the controller 27 executes control for driving the pan mechanism section 53 so that it moves to a pan position expressed by x°+180° (which may be x°−180°). This control may be performed in the same manner as in step S102 in FIG. 12.

In conjunction with the processing in S204, in step S205, the controller 27 executes tilt-drive control so that the tilt position moves from the current tilt position y° to a tilt position −y°.

In step S206, the controller 27 executes control for causing the display section 33 to display a shot image obtained as a result of the processing in step S201.

In such control and processing, during the shot-image presentation operation, panning is performed so that the pan mechanism section 53 is rotated by 180° relative to the pan position x° obtained during the automatic photography and tilting is performed so that the tilt position reaches the tilt position at the tilt angle value that is inverted relative to the tilt position y° obtained during the automatic photography, as described above with reference to FIG. 13.

<4. Shot-Image Presentation Operation (Third Example)>

A description will now be given of an overview of an operation of a third example of the shot-image presentation operation according to the present embodiment. In the third example, the operation can be divided into a mode in which the number of subjects photographed within the image-capture viewing field is one and a mode in which the number of subjects photographed within the image-capture viewing field is more than one.

A description will first be given of a case in which the number of subjects is one.

Figure 15C:
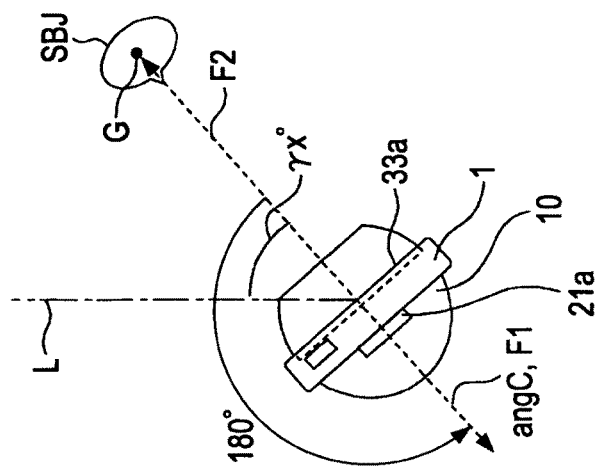
FIGS. 15A to 15C are schematic views illustrating an example of the operation of the image capture system, when the number of subjects is one, according to a third example of the shot-image presentation operation.
Figure 15B:
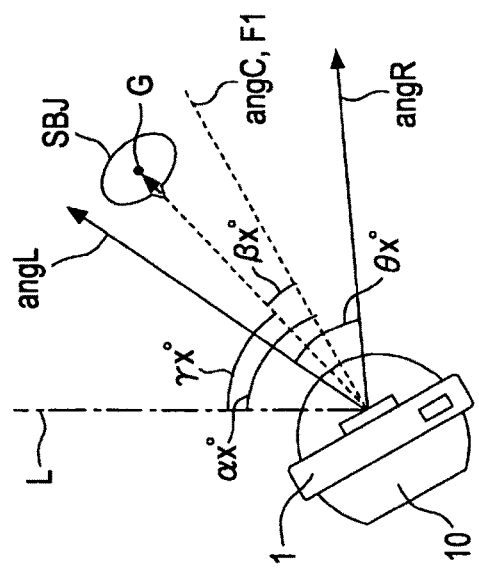
Figure 15A:
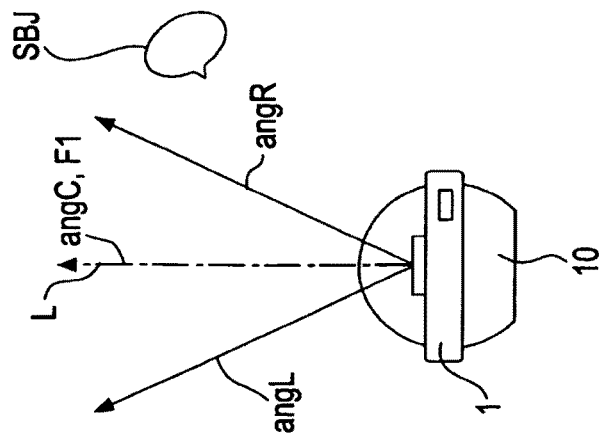

FIG. 15A is a top view of the image capture system (in which the digital still camera 1 is mounted on the platform 10) according to the present embodiment.

In FIG. 15A, the digital still camera 1 is assumed to be located at the pan reference position in the movable range in the pan direction (i.e., in the horizontal direction) of the pan mechanism section 53 of the platform 10. In this case, a reference line L is in agreement with and parallel with the optical axis of the lens section 21a (in the optical system section 21), i.e., the straight axis corresponding to the image-capture direction F1.

In this case, the set horizontal field angle (the horizontal zoom angle) is expressed by a field-angle center angC, a field-angle left end angL, and a field-angle right end angR. The field-angle center angC also corresponds to the image-capture optical axis of the digital still camera 1, i.e., the image capture detection F1. The angle between the field-angle center angC and the field-angle left end angL and the angle between the field-angle center C and the field-angle right end angR are the same.

In addition, it is assumed in this case that, as shown in FIG. 15A, one human subject SBJ is present at a position to the right of the horizontal field angle, viewed from the lens section 21a of the digital still camera 1.

For example, it is assumed that, as shown by a change from the state in which the image capture system and the subject have a positional relationship illustrated in FIG. 15A to a state illustrated in FIG. 15B, the digital still camera 1 is rotated from the pan reference position to a position by αx° (this position will be referred to as a "pan-direction image-capture position)αx°, so that the subject SBJ fits in the range of the horizontal field angle. Although not shown, it is assumed that the subject SBJ also fits in the range of the vertical field angle.

That is, in the state illustrated in FIG. 15B, the subject SBJ fits in the image-capture viewing field of the digital still camera 1.

It is further assumed that, in this state, the digital still camera 1 executes automatic photography.

In the third example, panning for shot-image presentation after execution of the automatic photography is performed in the following manner. The automatic photography operation in this case is also assumed to be self-timer photography.

During self-timer photography illustrated in FIG. 15B, the subject SBJ is present so that a center position (a center G) thereof in the horizontal direction corresponds to a line corresponding to an angle obtained by γx° clockwise rotation relative to the reference line L.

The angle γx° will also be referred to as a "pan-direction subject position γx°". The pan-direction subject position γx° represents, in the pan direction, an absolute subject position relative to the pan reference position. The center G of the subject SBJ is a point that serves as a reference to indicate the position of the subject SBJ.

As shown by a change from the state in FIG. 15B to a state in FIG. 15C, the panning in the third example is performed so that the field-angle center angC of the digital still camera 1 (i.e., the image-capture optical axis in the image-capture direction F1) lies on an extension of a straight line corresponding to the pan-direction subject position γx°. That is, the pan drive section 53 is driven so that the pan position (expressed by γx°+180°, which may be γx°−180°) obtained by 180° rotation relative to the pan-direction subject position γx° is reached. For comparison, in the first and second examples, panning is performed so that the pan position is reached simply at 180° relative to the pan position obtained during the self-timer photography.

Even when no subject is present at the center in the horizontal direction in an image frame corresponding to the image-capture viewing field during self-timer photography, the panning performed as illustrated in FIG. 15C allows the display screen section 33a to be directed, in the pan direction, almost exactly toward the face of the human subject SBJ.

The pan-direction subject position γx° is determined in order to perform the above-described panning in the third example. Thus, a method for determining the pan-direction subject position γx° will now be described.

Figure 17:
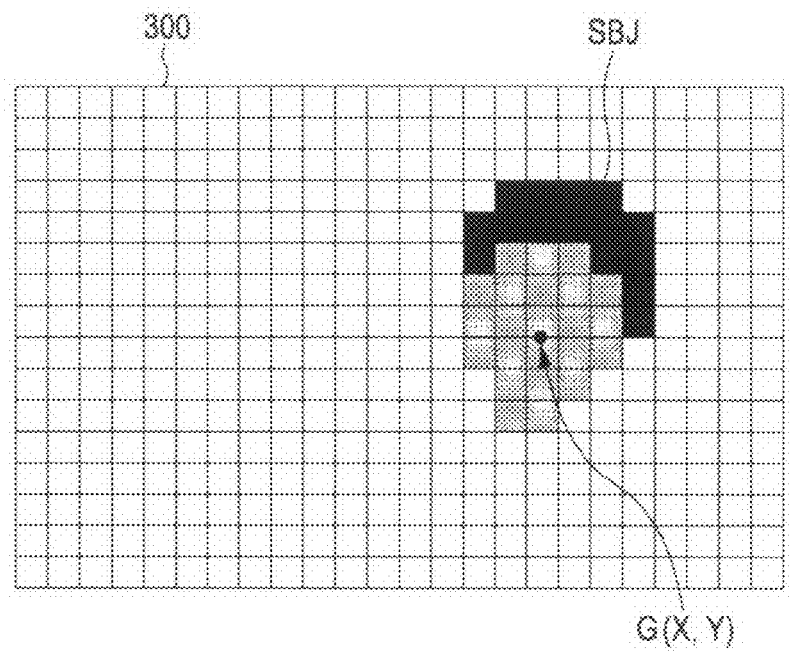
FIG. 17 illustrates the center of a single subject.

FIG. 17 illustrates image contents of an image captured by the digital still camera 1, the image contents showing one human subject SBJ. In FIG. 17, one screen is sectioned into a matrix to schematically illustrate that the screen represented by captured-image data is made of a collection of a predetermined number of horizontal and vertical pixels.

First, by using a face-detection processing function of the signal processor 24, the digital still camera 1 performs subject detection (face detection) on captured-image data having the image contents illustrated in FIG. 17. Consequently, the face of one subject SBJ illustrated in FIG. 17 is detected. As a result of such subject detection, information regarding the number of subjects, the position and the size of each subject, and so on is obtained. In the case of FIG. 17, it is detected that the number of subjects is one. The center G of the subject is then determined as the position of the subject.

On the screen represented by the captured-image data, an X coordinate and a Y coordinate are set based on a predetermined resolution corresponding to, for example, the number of horizontal pixels and the number of vertical pixels, respectively. The center G can be expressed by the X coordinate and the Y coordinate.

For example, a currently available subject-center detection system may be employed to define the position of the center G of a subject in an image and to set the center G.

The size of each subject may be determined by identifying a face portion through, for example, face detection processing and determining the number of pixels in the detected area.

In the present embodiment, as described above, the center G of the subject SBJ can be determined as a result of the subject detection processing.

In addition, the pan-direction subject position γx° can be determined in the following manner.

Now, reference is again made to FIG. 15B showing the state during self-timer photography.

The angle defined by the pan reference position (the reference line L) and the center field angle angC illustrated in FIG. 15B is represented by αx°. The angle αx° corresponds to a pan position during the self-timer photography.

A horizontal field angle corresponding to the angle between the field-angle left end angL and the field-angle right end angR is represented by θx°.

The center G of the subject SBJ in this case can be regarded as being located on an axis corresponding to an angle rotated anticlockwise by an angle βx° relative to the center field angle angC (the image-capture direction F1). The angle βx° is referred to as a "relative-position angle" since it indicates the subject SBJ position determined relative to the center-field angle angC (the image-capture direction F1).

Figure 19:
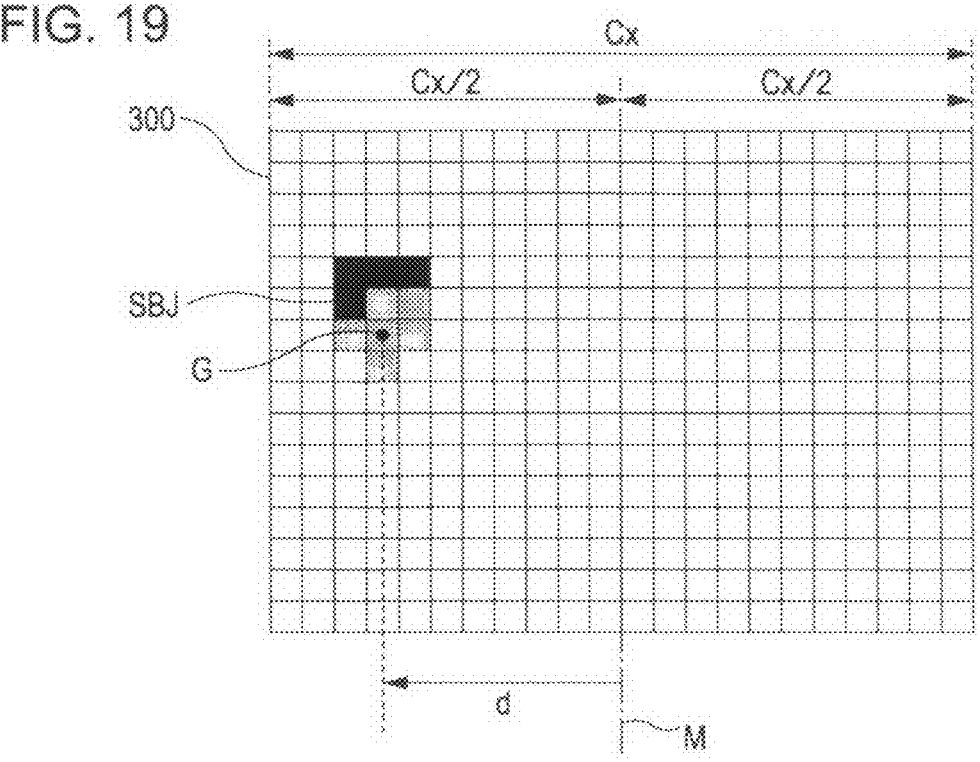
FIG. 19 illustrates an example of a relationship between a relative-position angle illustrated in FIG. 15B and a subject position in a captured image.

FIG. 19 shows an image captured by the digital still camera 1 in the positional state illustrated in FIG. 15B.

In FIG. 19, Cx indicates a horizontal image-frame size (which can be expressed by, for example, the number of pixels) in an image frame 300 of the captured image and M indicates a vertical line passing through the center of the horizontal image-frame size. The vertical line M is assumed to be a reference in the horizontal direction (i.e., a reference of X-axis coordinates: X=0) in the image frame 300 of the captured image. A horizontal X-axis coordinate in an area to the right of the vertical line M is a positive coordinate and a horizontal X-axis coordinate in an area to the left of the vertical line M is a negative coordinate. In this case, the value of the horizontal coordinate X of the subject SBJ who lies in the image frame 300 of the captured image is d. The X coordinate value d in the case of FIG. 19 is a negative value.

The relationship (ratio) between the X coordinate value d from the center of the subject SBJ in FIG. 19 and the horizontal image-frame size Cx corresponds to the relationship (ratio) between the relative-position angle βx° and the horizontal angle θx° in FIG. 15A.

Therefore, the relative-position angle βx° is given by:

$$\beta x° = (d/Cx) * \theta x° \quad (1)$$

In FIG. 19, the relationship of the angle value of the pan-direction image-capture position αx°, the relative-position angle βx°, and angle value of the pan-direction subject position γx° is given by:

$$\alpha x° = \gamma x° - \beta x° \quad (2)$$

Therefore, the pan-direction subject position γx° can be determined as:

$$\gamma x° = (d/Cx) * \theta x° + \alpha x° \quad (3)$$

That is, the pan-direction subject position γx° can be determined from parameters of the horizontal image-frame size Cx, the X coordinate value d of the subject SBJ in the image frame of the captured image, the horizontal field angle θx°, and the pan-direction image-capture position αx°.

Of the parameters, the horizontal image-frame size Cx is known. The X coordinate value d of the subject SBJ in the image frame of the captured image is information of the horizontal position of the subject detected in the captured image, and thus can be obtained by the subject detection processing according to the present embodiment. The information of the horizontal field angle θx° can be obtained based on information associated with field angle (zoom) control. More specifically, the information of the horizontal field angle θx° can be determined by, for example, pre-storing information of a standard field angle when the zoom magnification of the zoom lens included in the optical system section 21 is set to 1× and using the standard field angle and a zoom position obtained according to zoom control. The pan-direction image-capture position αx° can also be obtained based on information associated with pan control.

Thus, in the image capture system according to the present embodiment, the pan-direction subject position γx° can be determined.

In the third example, the image capture system can also be configured so as to perform control in the tilt direction, as in the above-described pan control.

Figure 20:
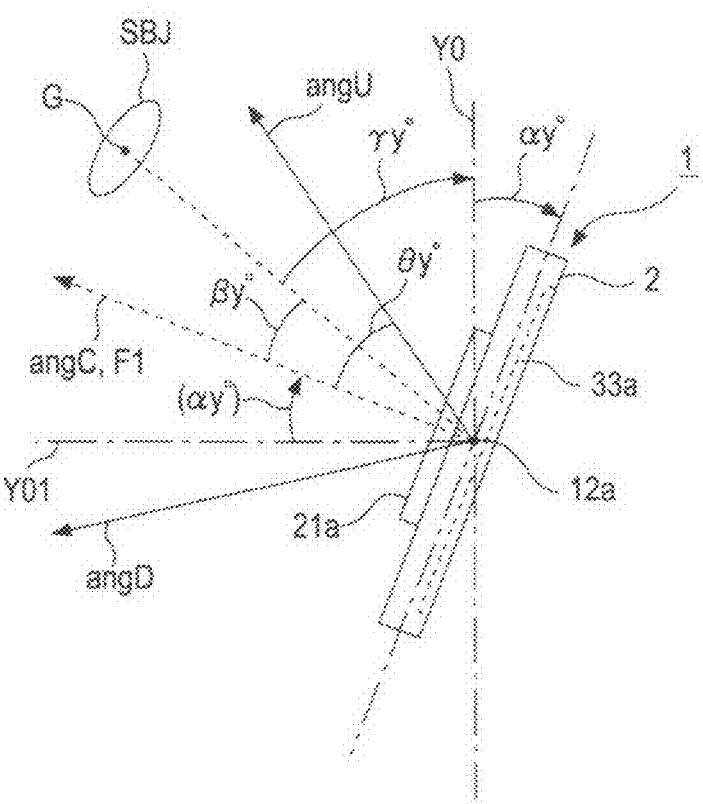
FIG. 20 is a schematic view illustrating reversal-drive control in the tilt direction according to the third example of the shot-image presentation operation.

FIG. 20 is a side view showing only the digital still camera 1, which is mounted on the platform 10. The digital still camera 1 is driven along the tilt direction so as to be rotated about a rotation axis 12a illustrated in FIG. 20. Although the rotation axis 12a illustrated in FIGS. 5 and 6 is located at the lower side of the digital still camera 1, the rotation axis 12a in FIG. 20 is illustrated as being located on the image-capture optical axis (the center field angle angC) of the digital still camera 1 for simplicity and ease of description.

It is now assumed that, for example, an image of a subject SBJ is captured and a shot image is obtained when the subject SBJ is in the illustrated positional relationship relative to the digital still camera 1 that is given an elevation angle of αy° in the elevation-angle direction, as illustrated in FIG. 20.

In the tilt direction, the elevation angle αy° corresponds to a tilt-direction image-capture position. The angle value of the tilt-direction image-capture position αy° is the same as the angle between a horizontal reference line Y01 (which is horizontal when it is orthogonal to the tilt reference position Y0) and the center field angle angC (the image-capture direction F1). The horizontal reference line Y01 agrees with the image-capture optical axis when the tilt-direction image-capture position αy° of the digital still camera 1 is zero.

The relative-position angle βy° in the tilt direction is the angle between the center field angle angC and the angle of the tilt position corresponding to the center G of the subject SBJ, as in the case of the pan direction.

As in the case illustrated in FIG. 19, the relative-position angle βy° in the tilt direction can be determined using parameters of a vertical image-frame size Cy, a Y coordinate value e (where the center point Y of the vertical image-frame size Cy is 0) of the center G of the subject SBJ in the image frame of a captured image, and a vertical field angle θy°, as:

$$\beta y° = (e/Cy) * \theta y° \quad (4)$$

When the number of subjects is more than one, an overall subject center Gt, instead of the center G of an individual subject, is used to determine the relative-position angle βy°, the Y coordinate value e, and so on and the relative-position angle βy° is determined based on equation (4).

As can be understood from FIG. 20, the tilt position of the digital still camera 1 may be set at an elevation angle of αy°+βy° in order for the image-capture optical axis to pass through the center of the subject SBJ. With this setting, during shot-image presentation, in order for the display screen section 33a of the digital still camera 1 to be directed exactly toward the subject SBJ, the digital still camera 1 is given a depression angle of αy°+βy°. That is, the digital still camera 1 is set at a tilt position expressed by −(αy°+βy°).

Thus, during shot-image presentation, in order to perform drive in the tilt direction so that the display screen section 33a is directed exactly toward the subject SBJ, the tilt-direction image-capture position αy° and the (tilt direction) relative-position angle βy° during the shot-image presentation are obtained. Thus, tilt-drive control is performed so that a tilt position expressed by −(αy°+βy°) is reached.

Determination of the tilt position expressed by −(αy°+βy°) in the manner described above can be regarded as being equivalent to determination of a tilt-direction subject position γy°. As can be understood from FIG. 20, the tilt-direction subject position γx° can be expressed, using αy°, βy°, and a constant "90°", as:

$$\gamma y = (\alpha y° + \beta y°) - 90°.$$

In this case, the angle value in the elevation-angle direction of the digital still camera 1 is a positive value and the angle value in the depression-angle direction is a negative value. That is, the pan-direction subject position γy° can be uniquely determined through determination of αy° and βy°.

As the shot-image presentation operation in the third example, the driving in the tilt direction may also be performed in conjunction with the driving in the pan direction, as described above. Such driving allows the display direction F2 to be directed almost exactly toward the subject person in both of the leftward/rightward direction and the upward/downward direction. In other words, no matter where the position of the subject SBJ is in the image frame of a captured shot image, the display screen section 33a is directed in a direction in which it is easy for the subject person to see during shot-image presentation.

Next, a case in which the number of subjects who are within the image frame of a shot image during self-timer photography is more than one will be described as the third example.

When the number of subjects is more than one, an overall subject center Gt, which is a center when multiple subjects are regarded as one group (an overall subject), is determined first.

Figure 18:
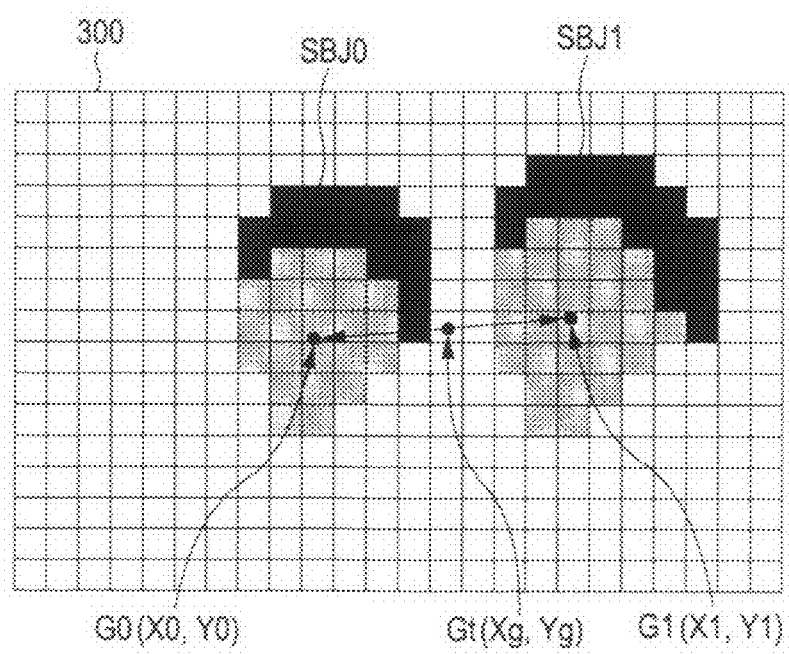
FIG. 18 illustrates an overall subject center of multiple subjects.

FIG. 18 illustrates, as an example, a case in which two subjects SBJ0 and SBJ1 exist in the image frame of a shot image.

For setting of the overall subject center Gt, the centers of the individual subjects are first determined. In FIG. 18, G0 (X0,Y0) and G1 (X1,Y1) are represented as the centers of the individual subjects SBJ0 and SBJ1, respectively.

An overall subject center Gt (Xg, Yg) is determined based on the centers G0 (X0,Y0) and G1 (X1,Y1) of the individual subjects.

Some methods can be conceived about how to set the overall subject center Gt. In this case, as a simple example, FIG. 18 illustrates a case in which a midpoint on a line segment connecting the centers of, among detected subjects, the subjects that lie at the left end and the right end on the screen is set as the overall subject center Gt.

Another conceivable example is a setting scheme in which weighting factors are given in accordance with attributes, such as the recognized/detected size of each subject, gender, and an age group (age segment), and are used so that, for example, the position of the overall subject center Gt is closer to a large-size subject.

With this arrangement, during shot-image presentation, panning is performed as illustrated in FIGS. 16A and 16B. FIG. 16A shows a positional relationship between the digital still camera 1 and the subjects SBJ0 and SBJ1 during self-timer photography. FIG. 16B shows a state in which, after the self-timer photography, panning is completed in order to perform shot-image presentation.

As can be understood from FIGS. 16A and 16B, when multiple subjects are photographed, the pan-direction subject position γx° and the relative-position angle βx° are determined based on the overall subject center Gt. In addition, in the same manner as the above-described change from FIG. 15B to FIG. 15C, pan control is performed so that a pan position expressed by γx°+180° (which may be)γx°−180° is reached.

The relative-position angle βy° in the tilt direction is also determined based on the overall subject center Gt and then tilt control is performed so that a target tilt position expressed by −(αy°+βy°) is reached.

Figure 21:
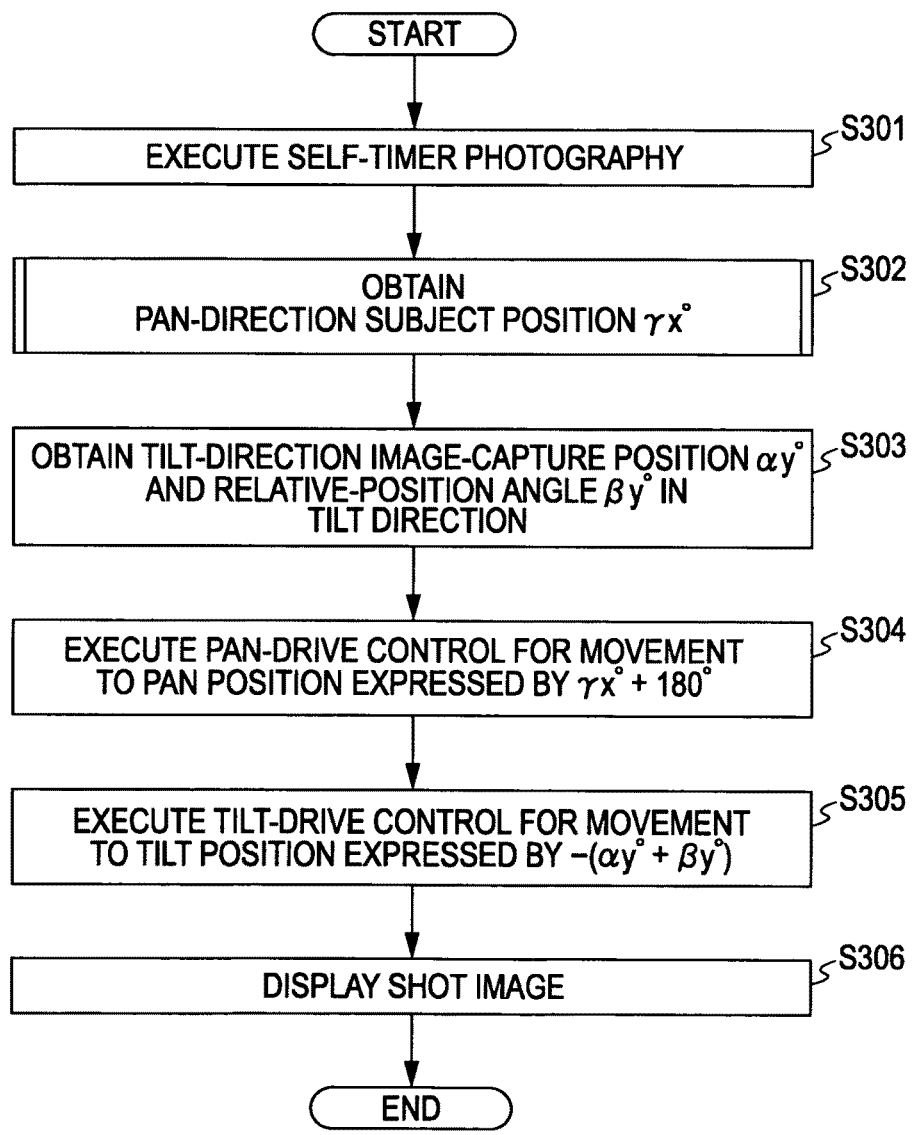
FIG. 21 is a flowchart illustrating an example of a processing procedure for the reversed drive control in the third example of the shot-image presentation operation.

FIG. 21 illustrates control and processing, executed by the image capture system, for the shot-image presentation operation in the third example. This processing can also be regarded as processing that the controller 27 (CPU) in the digital still camera 1 executes in accordance with a program.

In step S301, the controller 27 executes self-timer photography, as automatic photography, to obtain shot-image data.

Next, in step S302, the controller 27 obtains the pan-direction subject position γx°. Details of the procedure in step S302 are shown in a flowchart of FIG. 22.

Figure 22:
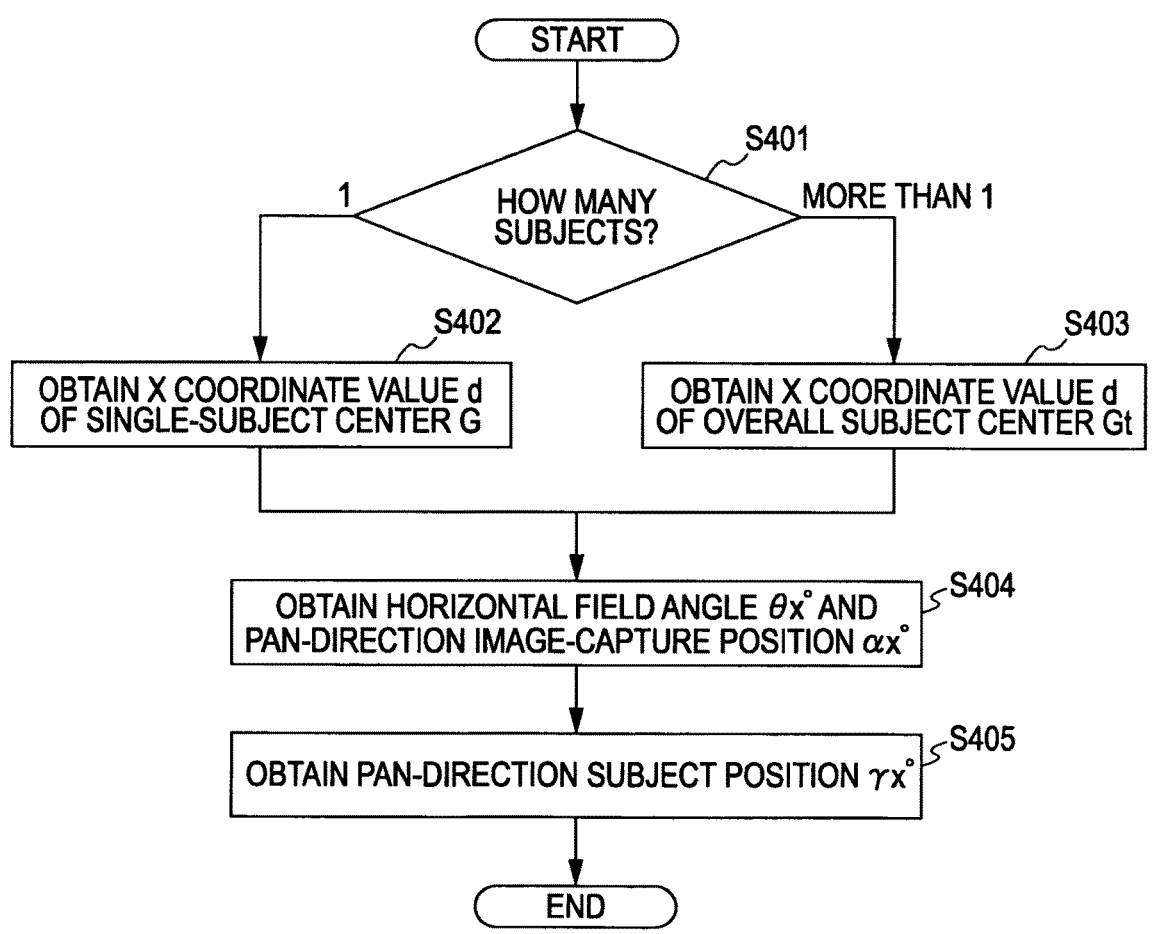
FIG. 22 is a flowchart illustrating an example of a processing procedure for determining a pan-direction subject position.

Referring to FIG. 22, first, in step S401, the controller 27 determines whether the number of subjects detected in a captured image obtained by the photography in step S301 is one or more than one. This determination may be made using information regarding the number of subjects obtained as a result of the subject detection executed by the signal processor 24, as described above.

When it is determined in step S401 that the number of subjects is one, the process proceeds to step S402 in which the controller 27 obtains the X coordinate value d of the center of the detected single subject (i.e., a single-subject center G). On the other hand, when it is determined in step S401 that the number of subjects is more than one, the process proceeds to step S403 in which the controller 27 obtains the X coordinate value d of the overall subject center Gt. It is assumed that, at this stage in the subject detection processing, the coordinates of the single-subject center G and the overall subject center Gt are already determined. Thus, in the processing in steps S402 and S403, the X coordinates of the single-subject center G and the overall subject center Gt, which are already determined through the subject detection, may be read, respectively.

After the X coordinate of the center is determined in step S402 or S403, procedures in steps S404 and S405 are executed.

In step S404, the horizontal field angle θx° is obtained based on, for example, a zoom position, and also the pan-direction image-capture position αx° is obtained. In addition, in step S405, an arithmetic operation given by equation (3) described above is performed to determine the pan-direction subject position γx°. In this manner, the pan-direction subject position γx° is obtained.

Referring back to FIG. 21, in step S303 that follows step S302, the current tilt position (the image-capture tilt position) αy° and the relative-position angle βy° in the tilt direction are obtained. In this case, for determination of the relative-position angle βy°, first, when the number of subjects is one, the Y coordinate value e of the single-subject center G of the subject is obtained, and when the number of subjects is more than one, the Y coordinate value e of the overall subject center Gt is obtained, as in steps S401 to S403 illustrated in FIG. 22. The obtained Y coordinate value e is then used to perform an arithmetic operation given by equation (4) described above.

Next, in step S304, the controller 27 executes pan-drive control so that a pan position expressed by $\gamma x°+180°$ is reached.

In conjunction with the pan-drive control, in step S305, tilt-drive control is executed so that a tilt position expressed by $-(\alpha y°+\beta y°)$ is reached.

In addition, in step S306, control is executed so that the display section 33 displays a reproduced shot image.

<5. Shot-Image Presentation Operation (Fourth Example)>

A shot-image presentation operation in a fourth example is based on the premise that the image capture system is configured so that it can perform, as automatic photography, automatic image capture of a subject or subjects with optimum image composition.

That is, the image capture system searches for, for example, a human subject, while automatically performing panning and tilting. Then, when a subject is found and is located in the image frame of a captured image, the image capture system determines image composition that seems to be appropriate for photographing the subject. The image capture system performs control for zooming, panning, and tilting for image-composition adjustment, automatically executes image capture in response to a trigger indicating that an image content having image composition determined for a captured image is obtained, and records the resulting shot image. Consequently, the automatically captured shot images are stored in the digital still camera 1.

Such photography through automatic subject search and image-composition adjustment is also referred to as "automatic image-composition control photography" hereinafter.

Figure 23:
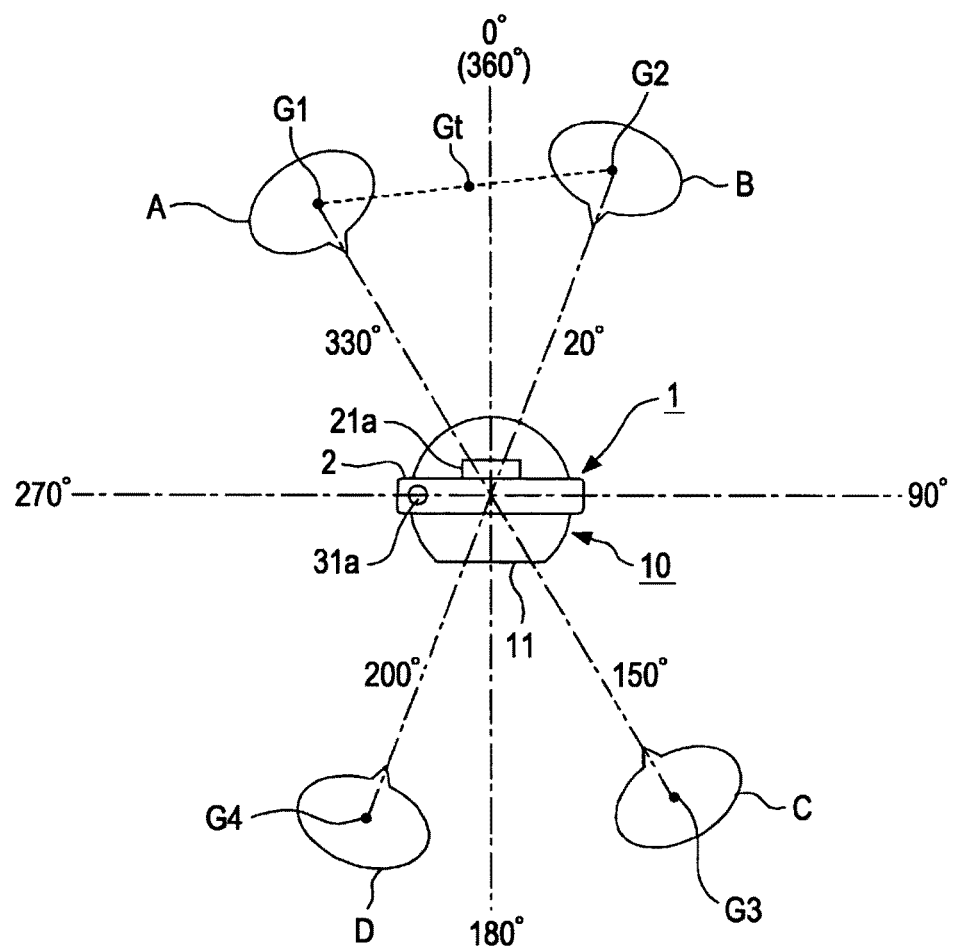
FIG. 23 illustrates an example of a specific positional relationship between the image capture system and subject people around it, the example corresponding to a fourth example of the shot-image presentation operation.

For example, it is now assumed that four subject people A, B, C, and D are present, with the illustrated positional relationship in FIG. 23, around the image capture system (the digital still camera 1 and the platform 10).

In this case, relative to the pan reference position (0°, 360°) of the image capture system, the center G1 of the subject person A lies at the position at 330°, the center G2 of the subject person B lies at the position at 20°, the center G3 of the subject person C lies at the position at 150°, and the center G4 of the subject person D lies at the position at 200°.

Figure 24A:
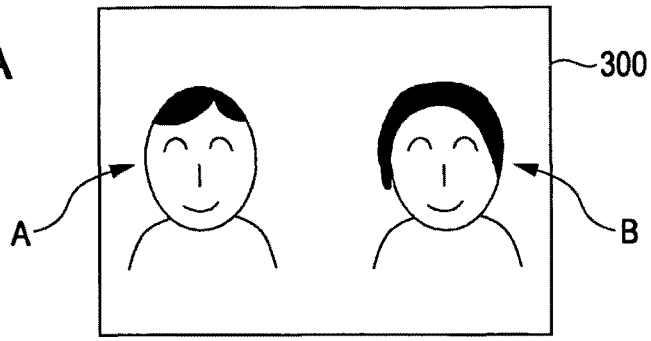
FIGS. 24A to 24D illustrate the contents of shot images captured by the image capture system under the situation illustrated in FIG. 23, the shot images corresponding to the fourth example of the shot-image presentation operation.
Figure 24B:
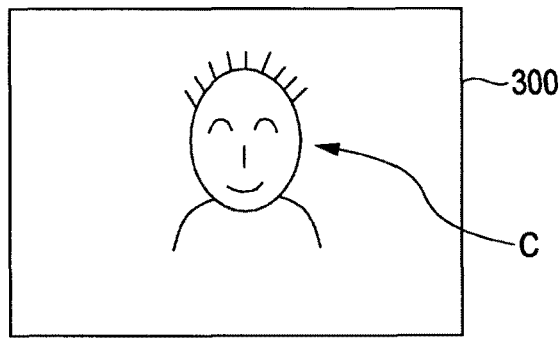
Figure 24C:
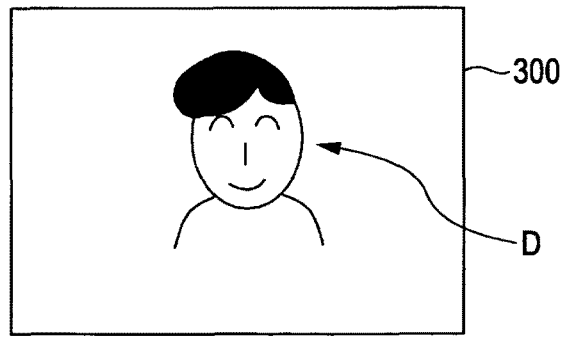

Under this situation, it is assumed that the image capture system executes photography while performing subject search and image-composition adjustment based on the automatic image-composition control photography, as described above, and consequently three shot images 1, 2, and 3 illustrated in FIGS. 24A, 24B, and 24C are recorded at one point in time.

The shot image 1 in FIG. 24A has image contents in which subjects A and B corresponding to the subject people A and B are within the image frame 300.

The shot image 2 in FIG. 24B has image contents in which only a subject C corresponding to the subject person C is within the image frame 300.

The shot image 3 in FIG. 24C has image contents in which only a subject D corresponding to the subject person D is within the image frame 300.

Figure 24D:
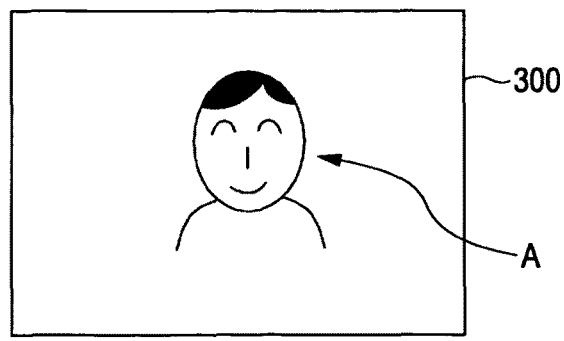

The shot image 4 in FIG. 24D has image contents in which only the subject A corresponding to the subject person A is within the image frame 300.

It is now assumed that, when the four shot images 1 to 4 illustrated in FIGS. 24A to 24D are recorded through the automatic image-composition control photography, a shot-image presentation operation is to be performed on the shot images 1 to 4. Some appropriate events can be conceived as a trigger for executing the shot-image presentation. One example of the trigger is a user operation for executing the shot-image presentation. In addition, the shot-image presentation operation may also be automatically executed when a predetermined number of shot images are captured. The shot-image presentation operation may also be automatically executed when a predetermined time passes.

In the fourth example, a shot-image presentation operation corresponding to the automatic image-composition control photography example illustrated in FIGS. 24A to 24D is performed in the following manner.

In this shot-image presentation operation, panning is performed so that the pan mechanism section 53 moves to pan positions at which the display direction F2 is sequentially directed exactly toward the locations where the subject people A, B, C, and D who are present around the image capture system. The panning in this case is assumed to be performed in the order of the subject people A, B, C, and D.

In this case, as a shot image associated with a subject person toward whom the display screen section 33a is directed each time the panning is performed, a shot image showing the subject person is displayed on the display screen section 33a.

Thus, initially, the panning is performed so as to reach a pan position at which the display direction F2 is directed exactly toward the subject person A. That is, in this case, of the shot images 1, 2, 3, and 4 illustrated in FIGS. 24A, 24B, 24C, and 24D, the shot images 1 and 4 showing the subject person A (the subject A) are displayed on the display screen section 33a. When multiple shot images to be displayed exist in such a manner, the shot images may be sequentially displayed at regular time intervals in accordance with a sequence of photography times. Alternatively, the shot images may be simultaneously displayed in split areas on the display screen section 33a. However, sequentially displaying the shot images one after another, as in the former example, is more advantageous in that the images can be displayed in large sizes.

After the shot images associated with the subject A are displayed as described above, the platform 10 performs panning so that the display direction F2 is directed toward the subject person B. Of the shot images 1 to 4 in FIGS. 24A to 24D, only the shot image 1 in FIG. 24A shows the subject person B. Thus, in this case, only the shot image 1 is reproduced and displayed.

Upon completion of the reproduction and display of the shot image 1, the platform 10 performs panning so that the display direction F2 is directed toward the subject person C and the shot image 2 showing the subject person C is reproduced and displayed.

Lastly, the platform 10 performs panning so that the display direction F2 is directed toward the subject person D, so that the shot image 3 in FIG. 24C showing the subject image D is reproduced and displayed.

In such a manner, in the fourth example, for each subject person who is present around the image capture system, an operation for displaying a selected image associated with the subject person while directing the display screen section 33a of the digital still camera 1 toward the subject person is performed as a shot-image presentation operation for shot images stored through the automatic image-composition control photography.

Next, a technical configuration example for the automatic image-composition control photography and the shot-image presentation in the fourth example will be described, and a description will first be given of the automatic image-composition control photography.

Figure 25:
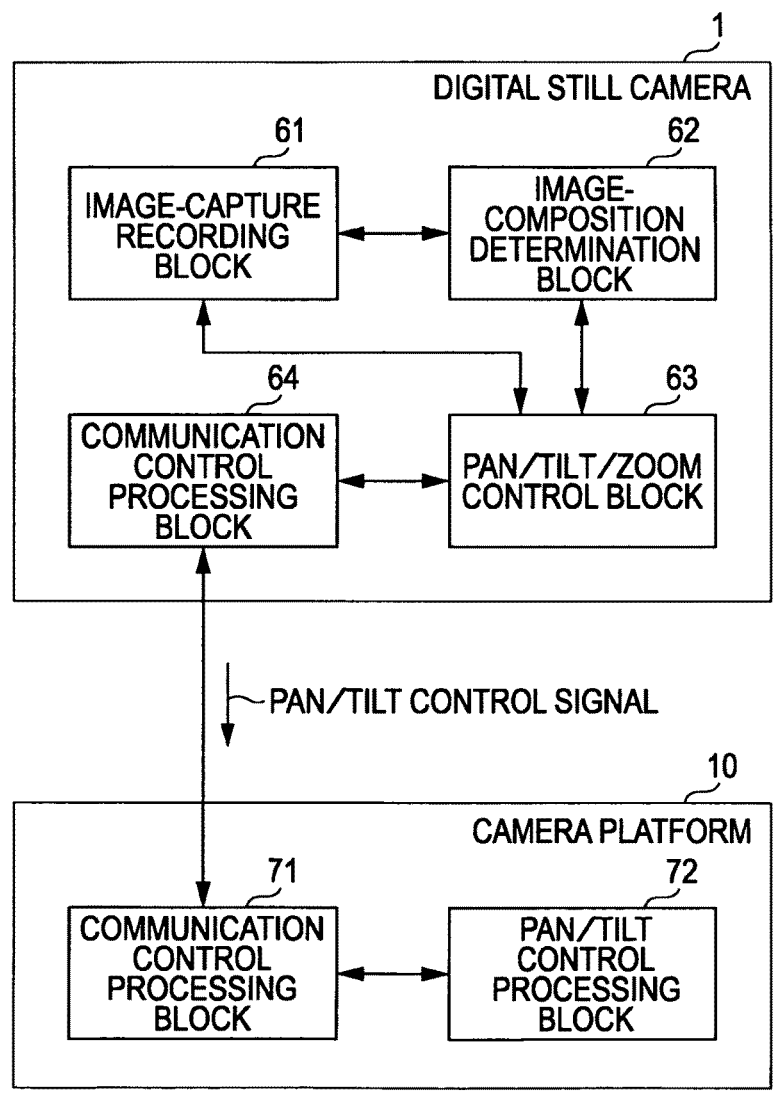
FIG. 25 is a block diagram illustrating an example of the system configuration of the digital still camera and the platform, the system configuration being associated with automatic image-composition control photography.

FIG. 25 illustrates, in blocks corresponding to respective functional operations, the internal configuration of the image capture system (the digital still camera 1 and the platform 10)

for performing the automatic image-composition control photography in the fourth example.

As illustrated in FIG. 25, the digital still camera includes an image-capture recording block 61, an image-composition determination block 62, a pan/tilt/zoon control block 63, and a communication-control processing block 64.

The image-capture recording block 61 corresponds to a section that executes control processing for obtaining, as image-signal data (captured-image data), an image obtained by the image capture and for storing the captured-image data in the storage medium. The "captured-image data" in this case includes not only shot-image data (still-image data obtained as a result of the image-capture operation) described above but also, for example, image data of a moving image obtained as a result of image capture.

The image-capture recording block 61 corresponds to a section including, for example, an optical system for image capture, an image capture device (an image sensor), a signal processing circuit for generating captured-image data from signals output from the image capture device, and a recording control/processing system for writing and recording (storing) the captured-image data to the storage medium.

The image-composition determination block 62 receives and inputs the captured-image data output from the image-capture recording block 61 and executes processing for determining image composition on the basis of the captured-image data. In addition, the image-composition determination block 62 executes image-composition acquirement control so as to obtain captured-image data having image contents corresponding to the determined image composition.

In response to an instruction from the image-composition determination block 62, the pan/tilt/zoon control block 63 executes pan/tilt/zoom control so as to obtain an image-capture viewing angle and image composition corresponding to the determined appropriate image composition. That is, as the image-composition acquirement control, the image-composition determination block 62 issues, to the pan/tilt/zoon control block 63, an instruction indicating the image-capture viewing angle and the image composition to be obtained according to the determined appropriate image composition. The pan/tilt/zoon control block 63 determines an amount of movement for the pan and tilt mechanisms of the platform 10 so that the digital still camera 1 is directed in the image-capture direction in which the indicated image-capture viewing angle and image composition are obtained, and generates a pan/tilt control signal indicating a movement corresponding to the determined amount of movement.

For example, the pan/tilt/zoon control block 63 also determines a zoom position for obtaining a determined appropriate field angle and controls a zoom mechanism, which may be included in the image-capture recording block 61.

The communication-control processing block 64 corresponds to a section that executes communication with a communication-control processing block 71, included in the platform 10, in accordance with a predetermined communication protocol. Through communication performed by the communication-control processing block 64, the pan/tilt control signal generated by the pan/tilt/zoon control block 63 is transmitted to the communication-control processing block 71 in the platform 10.

For example, as illustrated in FIG. 25, the platform has the communication-control processing block 71 and a pan/tilt control processing block 72.

The communication-control processing block 71 corresponds to a section for executing communication with the communication-control processing block 64 in the digital still camera 1. Upon receiving the aforementioned pan/tilt control signal, the communication-control processing block 71 outputs the pan/tilt control signal to the pan/tilt control processing block 72.

The pan/tilt control processing block 72 corresponds to a function for executing pan/tilt-control-related processing of the control processing executed by the controller 51.

In accordance with the pan/tilt control signal, the pan/tilt control processing block 72 controls a pan drive mechanism section and a tilt drive mechanism section (which are not illustrated). As a result, panning and tilting for obtaining a horizontal image-capture viewing field and a vertical image-capture viewing field are performed so as to correspond to the appropriate image composition.

In this case, the image-composition determination block 62 executes subject detection processing. When no subject is detected as a result of the subject detection processing, the pan/tilt/zoon control block 63 can perform pan/tilt/zoon control for searching for a subject, for example, in response to an instruction.

The configuration of the image capture system illustrated in FIG. 25 and the configuration of the digital still camera 1 and the platform 10 illustrated in FIGS. 7 and 8 have relationships, for example, as described below. The relationships described below should be construed as merely one general example and thus may have relationships other than those described below.

The image-capture recording block 61 in the digital still camera 1 in FIG. 25 corresponds to, for example, a section including the optical system section 21, the image sensor 22, the A/D converter 23, the signal processor 24, the encoding/decoding section 25, and the media controller 26 in FIG. 7. Captured-image data that the image-composition determination block 62 uses for the image-composition determination processing can be obtained, for example, at a predetermined stage of the signal processing performed by the signal processor 24.

The image-composition determination block 62 in the digital still camera 1 in FIG. 25 corresponds to, for example, the image processing function, included in the signal processor 24 in FIG. 7, for the subject detection processing and the controller (CPU) 27 for executing the program associated with the subject detection processing and the image-composition determination processing.

The pan/tilt/zoon control block 63 in FIG. 25 corresponds to, for example, a processing function that the controller 27 in FIG. 7 executes for the pan/tilt/zoom control.

The communication-control processing block 64 in the digital still camera 1 in FIG. 25 corresponds to, for example, the platform communication section 34 in FIG. 7 and a processing function that the controller 27 executes for communication using the platform communication section 34.

The communication-control processing block 71 in the platform 10 in FIG. 25 corresponds to, for example, the communication section 52 in FIG. 8 and processing executed by the controller 51 for communication using the communication section 52.

The pan/tilt control processing block 72 in FIG. 25 corresponds to, for example, a function for executing the pan/tilt-control-related processing of the control processing executed by the controller 51 in FIG. 8. In accordance with an input control signal, the pan/tilt control processing block outputs, to the pan driver 55 and the tilt driver 58, signals for controlling the operations of the pan mechanism section 53 and the tilt mechanism section 56.

As described above, during photography (image-capturing and recording of captured-image data) using the digital still camera 1, the image capture system having the configuration illustrated in FIG. 25 automatically executes an operation for first determining (finding) appropriate image composition and recording captured-image data with image contents having the appropriate image composition. This arrangement makes it possible to obtain a photographic image having a satisfactory quality through photography without the user having to determine a state of image-forming elements in the image composition.

With such a system, no one has to hold the camera during photography, so that all people who are at a place where the photography is performed can become subjects. Even when a user who becomes a subject does not particularly attempt to enter the range of the image-capture viewing field of the camera, a picture showing the subject is obtained. This means that chances of photographing natural appearances of people who are at the photography place increase, so that a larger number of pictures having a feel that has been rare thus far can be obtained.

Figure 26:
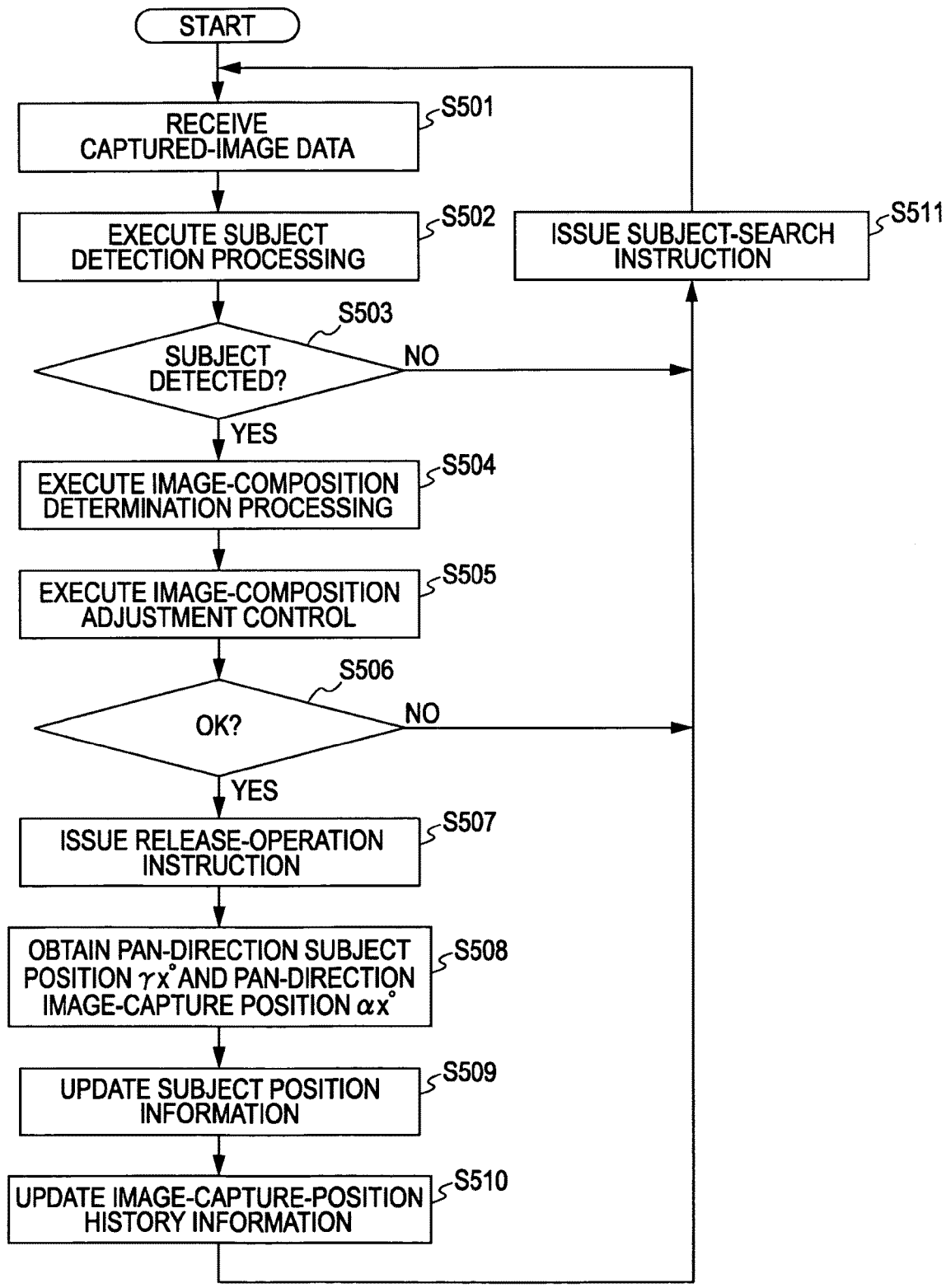
FIG. 26 is a flowchart illustrating an example of a processing procedure for the automatic image-composition control photography in the fourth example of the shot-image presentation operation.

FIG. 26 is a flowchart illustrating an example of a processing procedure executed by the image-composition determination block 62 (and the pan/tilt/zoon control block 63).

First, in step S501, the image-composition determination block 62 receives (inputs) captured-image data (for a frame image, for example) obtained through image capture performed by the image-capture recording block 61 and executes subject detection processing by using the received captured-image data.

The subject detection processing in this case refers to processing for identifying and detecting a subject as a person from the image contents of the received captured-image data. Information obtained as a result of the detection includes the number of human subjects, the position information (the center) of each subject in an image frame, the size (area) of each subject in the image, and so on.

Specifically, a face detection technology can be used as a scheme for the subject detection processing. Some systems and schemes for the face detection are available.

Which system or scheme is to be employed in the present embodiment should not be particularly limited and thus may be determined depending upon an accuracy of detection and the degree of difficulty in design as well as, for example, a combination with a scheme employed for the still-image detection described below.

The scheme and the algorithm for the subject detection processing at this stage may be a scheme and an algorithm for detecting a subject without discriminating between a real subject that is a real subject and an unreal subject.

The subject detection processing performed in step S502 can be realized as image signal processing. For example, when the image capture system is configured so that the image signal processing is executed by a DSP (digital signal processor), the subject detection processing can be realized by a program and instructions for the DSP.

Next, in step S503, the image-composition determination block 62 determines whether or not one or more effective subjects are detected, on the basis of the result of the subject detection processing performed in step S502 described above.

When a negative determination result (No) is obtained in this case, the process proceeds to step S511 in which a subject-search instruction is issued and then the process returns to step S501. When the process returns from step S511 to step S501 in such a manner, in steps S501 to S503, capture-image data is received while pan/tilt/zoom control for the subject search is executed and then subject detection is executed as the subject search.

In step S504, image-composition determination processing for determining optimum image composition for a photographic image showing the detected subject(s) is executed on the basis of information such as the number of subjects detected in step S502, the position and the size of each subject, and so on. Information obtained as a result of the determination is sent to the pan/tilt/zoon control block 63.

A variety of specific algorithms are available as the image-composition determination processing. In one simple example, in accordance with the rule of thirds, it is possible to employ an algorithm for determining, as optimum image composition, image composition in which the subject center G (or the overall subject center Gt) in an image frame lies on virtual lines that divide the image frame into three areas in the horizontal or vertical direction.

Processing in step S505 that follows step S504 is performed by the pan/tilt/zoon control block 63. That is, the pan/tilt/zoon control block 63 executes pan/tilt/zoon control for image-composition adjustment so that an image-capture viewing field corresponding to the result of the image-composition determination is obtained.

After the image-composition adjustment processing in step S505 is started, a determination is made in step S506 as to whether or not the image composition is OK, that is, whether or not the image composition that is currently actually obtained for an image of the capture-image data is in a state that can be regarded as being the same as (e.g., a state that is similar, at a certain level or higher, to) the image composition determined in step S505. This determination can be realized, for example, by causing the image-composition determination block 62 to recognize changes in the subject position and size indicated by the subject information obtained after the result of the image-composition determination is output.

In this case, when no satisfactory image composition (i.e., not OK) is obtained for some reason even after the pan/tilt/zoom movement and drive are performed by a necessary amount, a negative determination result (No) is output in step S506. In this case, the process returns to step S501 via step S511, so that the subject search is resumed.

On the other hand, when a determination result indicating that satisfactory image composition is obtained (i.e., OK) in step S506, the process proceeds to step S507 in which an instruction is issued so as to execute a release operation, i.e., an operation for recording currently obtained captured-image data as a still image (which becomes a shot image). In this case, the processing for the release-operation instruction may also be regarded as processing that is executed by, for example, the image-composition determination block 62.

In response to the release-operation instruction, the pan/tilt/zoon control block 63 first stops the pan/tilt/zoom movement and the drive for the image-composition adjustment. Consequently, the image capture system enters a state in which the operations of the panning, tilting, and zooming are stopped. Under this situation, the image-capture recording block 61 generates image data, which has one shot image, from the captured-image data obtained at this point and causes the generated image data to be recorded.

After the release-operation instruction is issued in step S507, the processing in steps S508, 5509, and S510 is executed and the process returns to step S501 via step S511. The processing in step S508, 5509, and S510 corresponds to the processing for managing information used for the shot-image presentation corresponding to the automatic image-composition control photography (described above with reference to FIGS. 23 and 24A to 24D) in the fourth example.

In step S508, information of the pan-direction subject position γx° for each subject shown on a shot image photographed (recorded) in response to the release-operation instruction issued in step S507 is obtained as information associated with the shot image. In addition, information of the pan-direction image-capture position αx°, which is the position at a pan angle when the shot image was photographed, is obtained. The pan-direction subject position γx° can be obtained through the determination described above with reference to FIG. 23. Information of the pan position when the pan/tilt/zoom movement and drive are stopped in response to the release-operation instruction given in step S507 may be obtained with respect to the pan-direction image-capture position αx°.

Next, in step S509, when the pan-direction subject position γx° obtained for each subject in step S508 is a newly obtained position, the controller 27 newly registers the pan-direction subject position γx° in subject-position information. That is, the controller 27 generates and updates subject-position information.

Figures 27A, 27B, 27C:
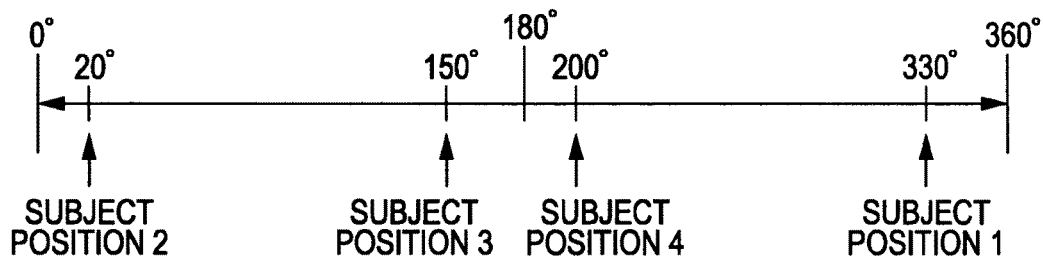
FIGS. 27A to 27C illustrate examples of the structures and contents of subject-position information and image-capture position history information in the fourth example of the shot-image presentation operation.

FIG. 27A shows, as the subject-position information created in such a manner, an example of the contents corresponding to a case in which images of subjects A, B, C, and D are captured as in FIGS. 23 and 24A to 24D.

As shown in FIG. 27A, in the subject-position information (the captured-image subject-position information), the values of the pan-direction subject positions γx° determined for, for example, the respective subjects A, B, C, and D are associated with numbers that are given, for the sake of convenience, in the subject-position information.

The subject-position information having the contents in FIG. 27A shows the values of the pan-direction subject positions γx° for subject positions 1 to 4, associated with the numbers 1 to 4, respectively, in the pan-position range of 0° to 360°, as schematically shown in FIG. 27B.

Although the subject-position information in FIG. 27A shows results in which the pan-direction subject positions γx° are associated with the numbers 1 to 4 in the order of the subjects A, B, C, and D, this is merely one example. In practice, the pan-direction subject positions γx° associated with the numbers are sequentially added and registered during a process in which, for example, shot-image photography is repeated through repeated execution of the processing illustrated in FIG. 26.

During the process of repeated execution of the processing illustrated in FIG. 26, a possibility that the same subject is shown on multiple shot images arises as a matter of course. When a value that is the same as or that is regarded as being the same as the value of the pan-direction subject position γx° obtained in step S508 is already registered in the subject-position information, processing for updating the subject-position information is not executed in step S509.

The subject-position information shown in FIG. 27A may be stored and managed in the ROM 28 under the control of the controller 27.

In step S510, the pan-direction image-capture position αx° obtained in step S508 is used to update image-capture position history information.

FIG. 27C shows an example of the contents of the image-capture position history information obtained at a stage when the shot images 1, 2, and 3 in FIGS. 24A, 24B, and 24C are photographed. As shown in FIG. 27C, the image-capture position history information has contents in which image IDs (identifiers) uniquely assigned to the respective shot images are associated with the pan-direction image-capture positions αx° obtained in step S508 when the shot images associated with the image IDs are photographed and recorded. In this case, image IDs 0001, 0002, 0003, and 0004 identify the shot images 1, 2, 3, and 4, respectively.

It is assumed that, for example, during the process of repeated execution of the above-described processing in FIG. 26, the shot images, 1, 2, and 3 are already photographed and recorded and the shot image 4 is not photographed and recorded yet. In this case, the pan-direction image-capture position information contains information that does not have information corresponding to the image ID 0004 shown in FIG. 27C and contains information indicating the pan-direction image-capture position αx° (=355°) associated with the image ID 0001, the pan-direction image-capture position αx° (=200°) associated with the image ID 0002, and the pan-direction image-capture position αx° (=150°) associated with the image ID 0003.

It is now assumed that, in this state, the processing in step S507 is executed and the shot image 4 is newly photographed and recorded. Correspondingly, in step S508 in this case, a pan-direction image-capture position αx° (330°) corresponding to the shot image 4 is obtained. In step S510, an image ID 0004 is generated so as to correspond to the shot image 4 and information in which the pan-direction image-capture position)αx° (330°) is associated with the image ID 0004 is added to the image-capture position history information to update it.

After the processing in step S510, the process returns to step S501 via step S511.

Figure 28:
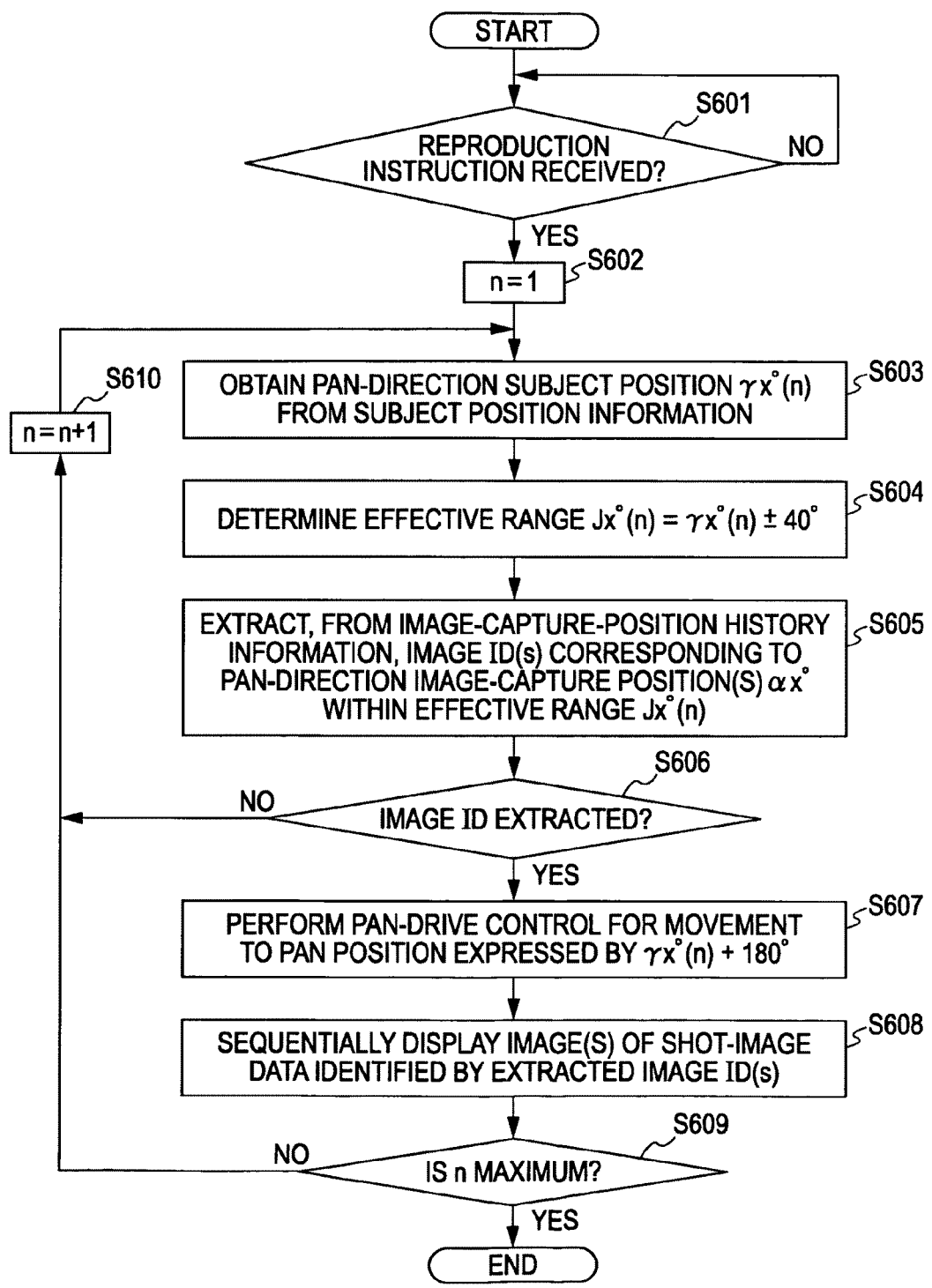
FIG. 28 is a flowchart illustrating an example of a processing procedure executed during shot-image presentation in the fourth example of the shot-image presentation operation.

Although not shown, for example, when an image reproduction instruction for shot-image presentation is received during the process of execution of the processing in FIG. 26, the process proceeds from the processing illustrated in FIG. 26 to processing illustrated in a flowchart of FIG. 28. FIG. 28 illustrates an example of a processing procedure for the shot-image representation in the fourth example. This processing procedure can also be regarded as a procedure executed by the controller 27 in the digital still camera 1.

First, in step S601 in FIG. 28, the controller 27 waits until an image reproduction instruction for the shot-image representation is received. While a negative determination result (No) is obtained in step S601, the processing in FIG. 26 is repeatedly executed. When an affirmative determination result (Yes) indicating that an image reproduction instruction for shot-image representation is received is obtained in step S601, the process proceeds to step S602 in which an initial value "1" is substituted into a variable n associated with the number in the subject-position information and the processing in step S603 is executed.

In step S603, the controller 27 obtains a pan-direction subject position γx° (n) associated with the number n from the subject-position information. That is, in the case of FIGS. 27A and 27B, the controller 27 obtains, of the subject positions 1 to 4, the angle value of the subject position specified by the subject position n.

For example, when the processing in step S603 is assumed to be executed for the variable n=1 in the case of the contents of the subject-position information shown in FIGS. 27A and 27B, γx° (1)=330° is obtained as the angle value of the subject position 1.

In step S604, the controller 27 determines an (pan direction) effective range Jx° (n) corresponding to the subject position γx°.

The effective range Jx° (n) indicates a pan-position range in which a person who is present at the subject position n is likely to be actually photographed on a shot image as a subject during the operation of the automatic image-composition control photography.

In this case, for example, the effective range Jx° (n) may be determined in the range of +40° to −40° with γx° (n) being a reference. Since γx° (1) is 330° in the case of the subject position 1, it is determined that the effective range Jx° (1) corresponding the value of γx° (1) is the range of 290° to (330°) to 10°.

In step S605, the image ID(s) corresponding to the pan-direction image-capture position(s) αx° that is within the effective range Jx° (n) determined in step S604 is extracted from the image IDs registered in the image-capture position history information.

In the case of FIGS. 27A to 27C, for the variable n=1, the effective range Jx° (1) is in the range of 290° to (330°) to 10°. In the image-capture position history information shown in FIG. 27C, the pan-direction image-capture positions αx° included in the effective range Jx° (1) correspond to 355° of the image ID 0001 and 330° of the image ID 0004. Thus, in this case, the image IDs 0001 and 0004 are obtained as a result of the extraction.

Next, in step S606, the controller 27 determines whether or not any image ID is extracted in step S605 described above. When a negative determination result (No) is obtained in step S606, it can be presumed that there is no shot image on which a person who is at the subject position 1 is captured. In this case, the variable n is incremented by 1 in step S610 and the process returns to step S603. That is, the process proceeds to processing for executing the shot-image presentation operation on a next subject position.

On the other hand, when an affirmative determination result (Yes) is obtained in step S606, the process proceeds to step S607.

In step S607, pan-drive control is executed so that a pan position expressed by γx° (n)+180° is reached. Next, in step S608, the controller 27 executes control for causing the display section 33 to sequentially display the image(s) of shot-image data, identified by the image ID(s) extracted in step S605, at regular intervals.

Upon completion of the display in step S608, a determination is made in step S609 as to whether or not the variable n is a maximum. When a negative determination result (No) is obtained in step S609, it means that a subject position on which the shot-image presentation is to be performed still remains. Thus, in this case, the variable n is incremented by 1 in step S610 and the process returns to step S603. On the other hand, when an affirmative determination result (Yes) is obtained in step S609, the series of processing for the shot-image presentation ends and the process proceeds to other processing. For example, the process proceeds to processing for the automatic image-composition control photography.

In connection with the examples of the processing in steps S607 and S608 described above with reference to FIGS. 23, 24A to 24D, and 27A to 27C, for the variable n=1, pan-drive control is performed so that a pan position expressed by γx° (1)+180° (=150°) is reached. Consequently, the display direction F2 of the digital still camera 1 is directed toward the subject person A corresponding to the subject position 1. Then, the shot images with the image IDs 0001 and 0004 extracted in step S605 are sequentially reproduced and displayed.

That is, as described above with reference to FIGS. 24A and 24D, the shot images 1 and 4 showing the subject person A are displayed on the display screen section 33a as shot images associated with the subject person A, while the display screen section 33a is directed exactly toward the subject person A.

The above description in the fourth example has been given of a case in which, in only the pan direction, the display screen section 33a is directed exactly toward the subject person. However, as in the third example and so on, the image capture system may also be configured to perform control in the tilt direction so that the display screen section 33a is directed exactly toward the subject person.

In such a case, after the processing in step S507 in FIG. 26 is executed, the tilt-direction image-capture position αy° and the relative-position angle βy° in the tilt direction are obtained for each subject, as in step S303 in FIG. 21, in addition to steps S508 to S510. Further, the tilt position expressed by −(αy°+βy°) to be set for the shot-image presentation is determined for each subject and the value of the tilt position is registered and stored in tilt-position setting information. Further, in step S607, the value of the tilt position (expressed by −(αy°+βy°)) registered in association with the subject is read from the tilt-position setting information, and drive control is performed so that the read tilt position is reached, in conjunction with the above-described pan-drive control.

A configuration for the shot-image presentation, as described below, can be conceived as a modification of the fourth example.

For example, the image-capture position information is updated as shot images are photographed during the automatic image-composition automatic photography, and no particular information is created as the subject-position information. Next, when shot-image presentation is to be performed, subject search is performed again with respect to the surroundings of 360° around the image capture system to obtain the position information (which corresponds to the pan-direction subject positions γx°, in the horizontal direction) of the subject people who are present around the image-capture system, and the obtained position information is used to create the subject-position information. Subsequently, the subject-position information and the image-capture position information are used to perform processing for selecting a shot image or shot images to be presented, as in the processing is steps S603 to S605 in FIG. 28. Next, in step S607, the subject-position information obtained by the above-described subject search is used to execute pan-drive control so that a pan position expressed by γx° (n)+180° is reached. With such processing, for example, even when the position of a subject person during shot-image presentation changes to some degree relative to the position of the subject during operation of the automatic image-composition control photography, it is possible to display a shot image so that the display direction F2 is appropriately directed toward the subject person so as to correspond to the change.

The automatic photography in the fourth example becomes effective when the automatic image-composition control photography is employed as described above. However, it is to be noted that the application of the automatic photography in the fourth example by no means restricts, for example, combination with an automatic photography operation other than the automatic image-composition control photography, such as self-timer photography.

<6. Shot-Image Presentation Operation (Fifth Example)>

A description will now be given of a fifth example of the shot-image presentation operation according to the present embodiment.

The operation of the image capture system in the fifth example is analogous to the operation in the fourth example, when viewed from the viewpoint of users. That is, the image capture system in the fifth example performs automatic image-composition control photography to capture shot images of automatically found subjects and stores (records) the shot images. When a shot-image presentation operation is to be executed on the shot images stored through the automatic image-composition control photography, the display screen section 33a of the digital still camera 1 is sequentially directed exactly toward each of subject people who are present around the image capture system and a shot image having image contents associated with the subject person (i.e., a shot image showing the subject person) is displayed.

Additionally, the fifth example employs an algorithm and processing that are different from those in the fourth example to realize the operations for the automatic image-composition control photography and the shot-image presentation.

In the fifth example, as the subject detection processing, individual-recognition processing for identifying an individual is also executed on each subject detected by face detection processing or the like. In the present embodiment, however, an algorithm for the individual-recognition processing is not particularly limited, as in the system and scheme for the face detection.

In the fifth example, specifically, after the release-operation instruction is executed in step S507 in FIG. 26, processing using an algorithm for updating two types of information, i.e., subject-specific individual-recognition information and in-image subject information, instead of the processing in steps S508 to S510, is performed during execution of the automatic image-composition control photography.

FIG. 29A shows an example of the contents of the subject-specific individual-recognition information obtained when four shot images 1 to 4 illustrated in FIGS. 24A to 24D are captured and recorded under the image-capture system surroundings/situation illustrated in FIG. 23.

As illustrated in FIG. 29A, the subject-specific individual-recognition information has a structure in which individual-recognition data of subject people recognized by individual-recognition processing (subject detection processing) are associated with corresponding subject numbers. In the individual-recognition processing, values of predetermined parameters that can express features of each individual are determined. The subject-specific individual-recognition information includes thus-determined parameter values.

In the example of FIG. 29A, the individual-recognition data of the subject person A is associated with subject number 1, the individual-recognition data of the subject person B is associated with subject number 2, the individual-recognition data of the subject person C is associated with subject number 3, and the individual-recognition data of the subject person D is associated with subject number 4.

FIG. 29B shows an example of the contents of the in-image subject information obtained when four shot images 1 to 4 illustrated in FIGS. 24A to 24D are captured and recorded under the image-capture system surroundings/situation illustrated in FIG. 23.

The in-image subject information has contents in which a shot image ID and a subject number (an in-image subject number) of each subject that is shown on the shot image indicated by the shot image ID are associated with each other.

In the example of FIG. 29B, subject numbers 1 and 2 corresponding to the individual-recognition data of the subjects A and B are first associated with the image ID 0001 assigned to the shot image 1 so as to correspond to the contents of the shot images in FIGS. 24A to 24D. Subject number 3 corresponding to the individual-recognition data of the subject C is associated with the image ID 0002 assigned to the shot image 2. Subject number 4 corresponding to the individual-recognition data of the subject D is associated with the image ID 0003 assigned to the shot image 3 and subject number 1 corresponding to the individual-recognition data of the subject A is associated with the image ID 0004 assigned to the shot image 4.

The information in FIG. 29A and the information in FIG. 29B may also be merged together into a single unit of information (photographed-image subject individual-recognition information). In the present embodiment, however, these types of information are separated as the individual types of information, as illustrated in FIGS. 29A and 29B, for convenience of description and with consideration of actual processing and so on.

When the shot image 1 in FIG. 24A is first captured and recorded in step S507 in FIG. 26, the individual-recognition data of the subjects A and B shown on the shot image 1 are obtained by the subject detection processing (the individual-recognition processing). Thus, the controller 27 generates subject-specific individual-recognition information so that the individual-recognition data of the subject A and the individual-recognition data of the subject B are associated with the corresponding subject numbers 1 and 2, and stores the generated subject-specific individual-recognition information.

The subject-specific individual-recognition information generated in such a manner identifies that subject numbers corresponding to the subjects A and B shown on the shot image 1 are 1 and 2, respectively. Thus, the controller generates in-image subject information so that the two subject numbers 1 and 2 are associated with the image ID 0001 assigned to the shot image 1 and stores the generated in-image subject information. Thereafter, the process returns to step S501 via step S511.

When the shot image 2 is captured and recorded subsequent to the shot image 1, the subject detection processing (the individual-recognition processing) is performed to obtain new individual-recognition data for the subject C shown on the shot image 2.

Thus, as the processing after step S507, the controller 27 updates the subject-specific individual-recognition information by additionally registering the individual-recognition data of the subject C at subject number 3. The controller 27 also updates the in-image subject information so that information in which subject number 3 is associated with the image ID 0002 of the shot image 2.

Subsequently, each time the shot image 3 or 4 is captured and recorded, the subject-specific individual-recognition information and the in-image subject information are updated, as appropriate, through a procedure as described above.

In the subject-specific individual-recognition information, however, the individual-recognition data corresponding to the current subject becomes in some cases the same data as (or data that is similar, to a degree regarded as being the same, to) the already registered individual-recognition data. In the case of FIGS. 24A to 24D, the subject A shown on the shot image 4 in FIG. 24D is already registered in association with subject number 1 when the shot image 1 is captured and recorded. In such a case, the arrangement may be such that the individual-recognition data for the subject-specific individual-recognition information is not additionally registered or the same individual-recognition data that is already registered is overwritten with the individual-recognition data obtained in association with the current shot image.

An algorithm as described below can also be conceived as an algorithm for creating the subject-specific individual-recognition information. That is, regardless of whether or not an image is to be captured as a shot image, individual-recognition processing is executed on subjects detected during a process of execution of panning and tilting through subject search and the resulting individual-recognition data are sequentially registered.

Figure 30:
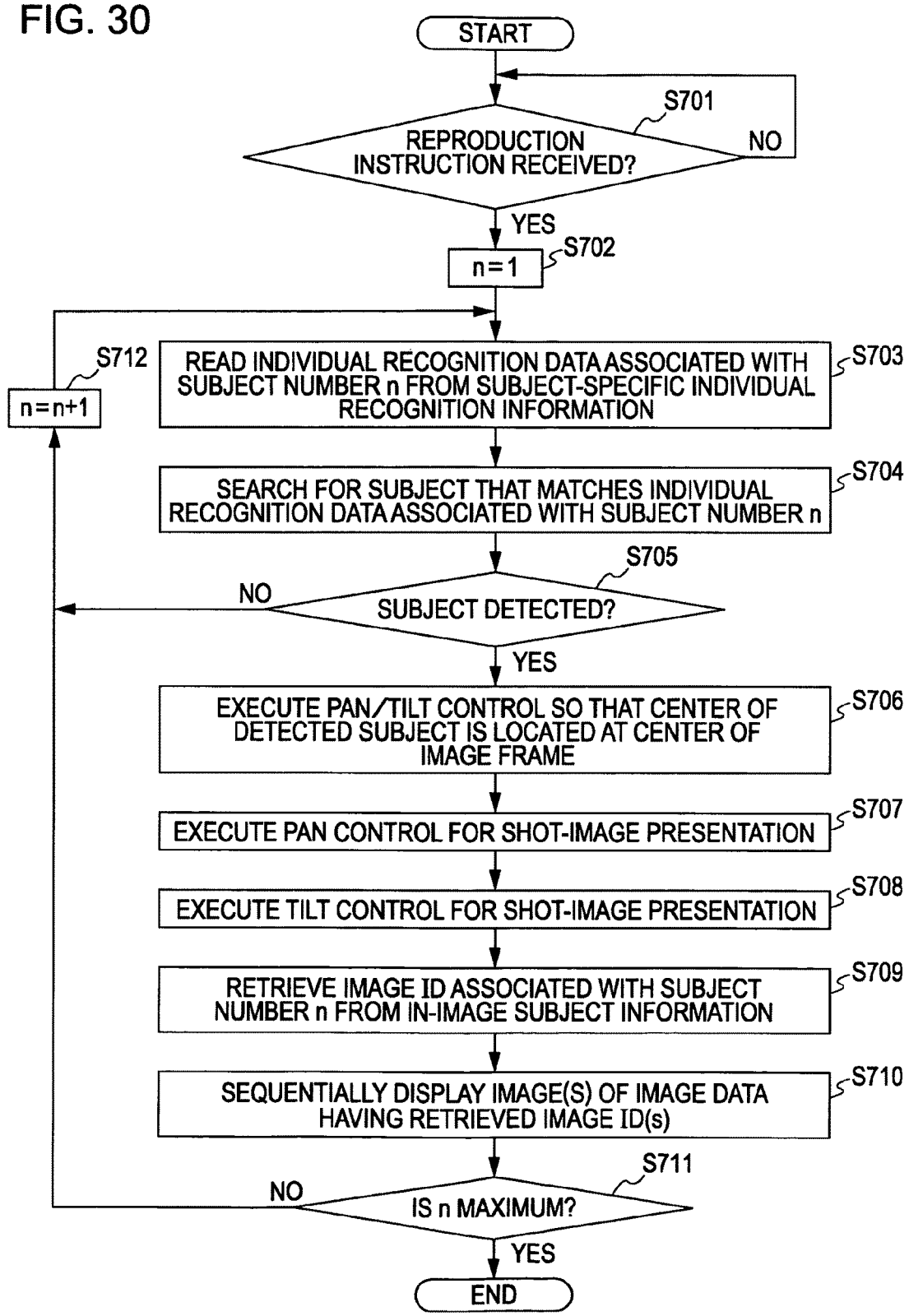
FIG. 30 is a flowchart illustrating an example of a processing procedure executed during shot-image presentation in the fifth example of the shot-image presentation operation.

FIG. 30 is a flowchart illustrating an example of a processing procedure, executed by the controller 27, for the shot-image presentation in the fifth example.

Referring to FIG. 30, first, in steps S701 and S702, the controller 27 waits until an image reproduction instruction for shot-image presentation is received, and when a reproduction instruction is received, "1" is initially substituted into a variable n, as in steps S601 and S602 shown in FIG. 28. Thereafter, the process proceeds to step S703.

In step S703, the controller 27 reads, from the subject-specific individual-recognition information, the individual-recognition data associated with subject number n. Next, in step S704, the controller 27 executes processing for searching for a subject that matches the individual-recognition data associated with subject number n read in step S703. During the search processing, the controller 27 performs individual-recognition processing on a subject, detected in the image-capture viewing field during image capture while performing pan/tilt/zoom control for subject search and changing the image-capture viewing field, to thereby obtain individual-recognition data. The controller 27 compares the obtained individual-recognition data with the individual-recognition data read in step S703. When a result indicating a match is obtained, this means that a subject to be searched for is found.

In step S705, the controller 27 determines whether or not a subject to be searched for is found as a result of the subject search processing executed as described above.

In this case, for example, when a subject to be searched for is not detected even after the series of search operations is performed as the subject search processing in step S704, a negative determination result (No) is obtained in step S705. One possible example of the case in which a negative determination result is obtained is a case in which a person corresponding to the subject to be searched for moved and left the surroundings of the image capture system. In such a case, the controller 27 increments the variable n by 1 in step S712, and the process returns to the processing in step S703, so that subject search processing is started on a next person as a subject.

On the other hand, when an affirmative determination result (Yes) indicating that a subject to be searched for is detected is obtained in step S705, the process proceeds to step S706.

In step S706, pan/tilt control is executed so that the center G of the detected subject lies at the center, in the horizontal and vertical directions, in the image frame of the captured image. At the pan and tilt positions obtained under the control, the image-capture direction F1 of the digital still camera 1 is directed toward the subject.

As can be understood from next processing in steps S707 and S708, the processing in step S706 is preliminary processing for executing processing, which is analogous to the processing performed in the second example, for performing pan/tilt drive for shot-image presentation.

Next, in step S707, the controller 27 executes pan control for the shot-image presentation. That is, pan-drive control is executed so that a pan position expressed by x°+180° is reached, where x° indicates the pan position obtained by the pan control in step S706.

In conjunction with the pan-drive control, in step S708, tilt control for the shot-image presentation is executed. That is, tilt-drive control is executed so that a tilt position expressed by −y° is reached, where y° indicates the tilt position obtained by the tilt control in step S706.

As a result of the execution of the processing in steps S707 and S708, the display direction F2 of the digital still camera 1 is directed toward the subject in both of the horizontal and the vertical directions.

Next, in step S709, the controller 27 refers to the in-image subject information to retrieve an image ID or image IDs associated with subject number n. That is, the controller retrieves a shot image or shot images on which a subject person identified by the individual-recognition data corresponding to subject number n is shown as a subject.

Subsequently, in step S710, in accordance with a predetermined order of reproduction (e.g., an order of image-capture times), the controller 27 causes the display section 33 to display the image(s) of the shot-image data having the image ID(s), retrieved in step S709, at regular intervals.

Thus, an operation for displaying the shot image(s) on which the subject person is shown is performed while the display screen section 33a is directed almost exactly toward the subject person associated with subject number n.

In step S711, as in step S609 in FIG. 28, the controller 27 determines whether or not the variable n is a maximum. When a negative determination result (No) is obtained, the process proceeds to step S712 in which the controller 27 increments the variable n by 1 and then the process returns to step S703. As a result, an operation for directing the display screen section 33a toward each subject person whose individual-recognition data is registered in the subject-specific individual-recognition information and for displaying a shot image on which the subject person is shown is sequentially executed.

According to such an algorithm, for example, even the position of a subject person during shot-image presentation changes greatly relative to the position of the subject during operation of the automatic image-composition control photography, it is possible to present a shot image having an appropriate content selected based on a face recognition result while appropriately directing the display direction toward the subject person. Since it is also possible to recognize a subject person who has moved and left the place, no useless searching is performed so as to present a shot image to the subject person.

In the above description, control is performed so that the display screen section 33a is directed exactly toward the subject person, as described in steps S706 to S708 in FIG. 30. However, for example, the fourth example may be applied to determine the pan-direction subject position γx° and the tilt-direction image-capture position αy° of the subject found in step S704 and the pan/tilt control may be performed based on the pan-direction subject position γx° and the tilt-direction image-capture position αy°.

In the fourth and fifth examples, during the shot-image presentation, with respect to a subject person to whom the display direction is directed, a shot image showing the subject person is selected and displayed as an image associated with the subject person. This arrangement, however, is one example, and conversely, for example, a shot image that does show the subject person may be selected as an image associated with the subject person. This is because, depending on the situation, the subject person may often desire to check a shot image showing subjects other than himself/herself, rather than a shot image showing himself/herself.

<7. Shot-Image Presentation Operation (Sixth Example)>

A description will now be given of a sixth example of the shot-image presentation operation according to the present embodiment.

The sixth example relates to a user interface for the shot-image presentation. Any of the schemes of the first to fifth examples described above may be employed as a mode for the automatic photography, the mode for the pan/tilt control for the shot-image presentation, and so on.

Figure 31:
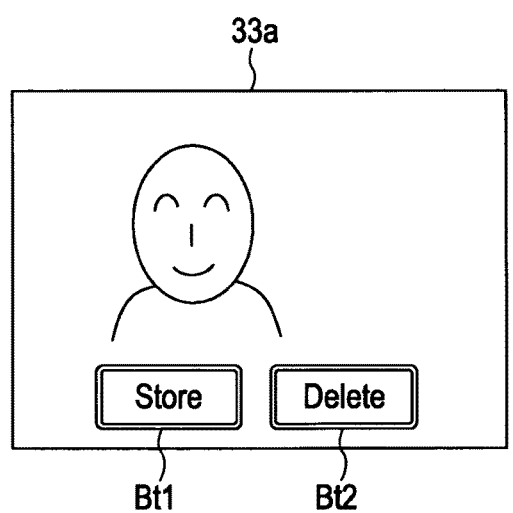
FIG. 31 illustrates an example of an image displayed on a display screen section during shot-image presentation in a sixth example of the shot-image presentation operation.

FIG. 31 illustrates an example of the display screen section 33a on which, upon image capture of one shot image, the shot image is displayed during a shot-image presentation operation.

As described above, the digital still camera 1 according to the present embodiment has a touch panel at the display screen section 33a. This arrangement allows the user to press an operation image, displayed on the display screen section 33a, with his/her finger to perform an operation.

Accordingly, in the sixth example, when a shot image is displayed on the display screen section 33a as a result of the shot-image presentation operation, for example, a "Store" button Bt1 and a "Delete" button Bt2 are simultaneously displayed as operation images, as illustrated in FIG. 31.

The "Store" button Bt1 and the "Delete" button Bt2 serve a GUI (graphical user interface) for prompting the user who is a subject person and who is presented the shot image to select whether to store or delete (not store) the displayed shot image and to give an instruction indicating the selection.

When the user wishes to store the displayed shot image upon viewing it, he or she performs an operation for pressing the "Store" button Bt1. In response to the operation, for example, the controller 27 causes the data of the currently displayed shot image to be stored and managed in the memory card 40.

On the other hand, when the user determines that it is not necessary to store the displayed shot image, he or she performs an operation on the "Delete" button Bt2. In response to the operation, the controller 27 performs control so that the currently displayed shot image is not stored in the memory card 40.

<8. Shot-Image Presentation Operation (Seventh Example)>

Next, a description will be given of a seventh example of the shot-image presentation operation according to the present embodiment.

The seventh example also relates to a user interface for the shot-image presentation, as in the sixth example. In addition, the seventh example is a modification of the sixth example and is based on the premise that, for example, automatic image-composition control photography is executed as the automatic photography.

An example of the user interface for the shot-image presentation will now be described as the seventh example with reference to FIG. 32.

It is now assumed that one shot image is photographed and recorded as a result of, for example, the automatic image-composition control photography. Referring to FIG. 32, (a) indicates a state in which the recorded shot image is reproduced and displayed on the display screen section 33a during the shot-image presentation operation.

In the seventh example, the "Store" button Bt1 and a "Retake" button Bt3 are displayed as operation images. As in the case in FIG. 31, the "Store" button Bt1 is used for an operation for giving an instruction for storing the shot image that is displayed simultaneously therewith. The "Retake" button Bt3 is used for an operation for giving, to the image capture system, an instruction for re-executing shot-image photography based on the automatic image-composition control photography. That is, in the seventh example, when the user does not prefer the displayed shot image, it is possible to cause the image capture system to re-execute automatic image-composition control photography in response to a user operation.

In the seventh example, the "Delete" button Bt2 may also be provided as in the sixth example in conjunction with the "Store" button Bt1 and the "Retake" button Bt3 so as to allow the user to perform an operation for simply deleting the shot image. In this case, however, a case in which the "Delete" button Bt2 is omitted is illustrated for convenience and ease of description.

Figure 32:
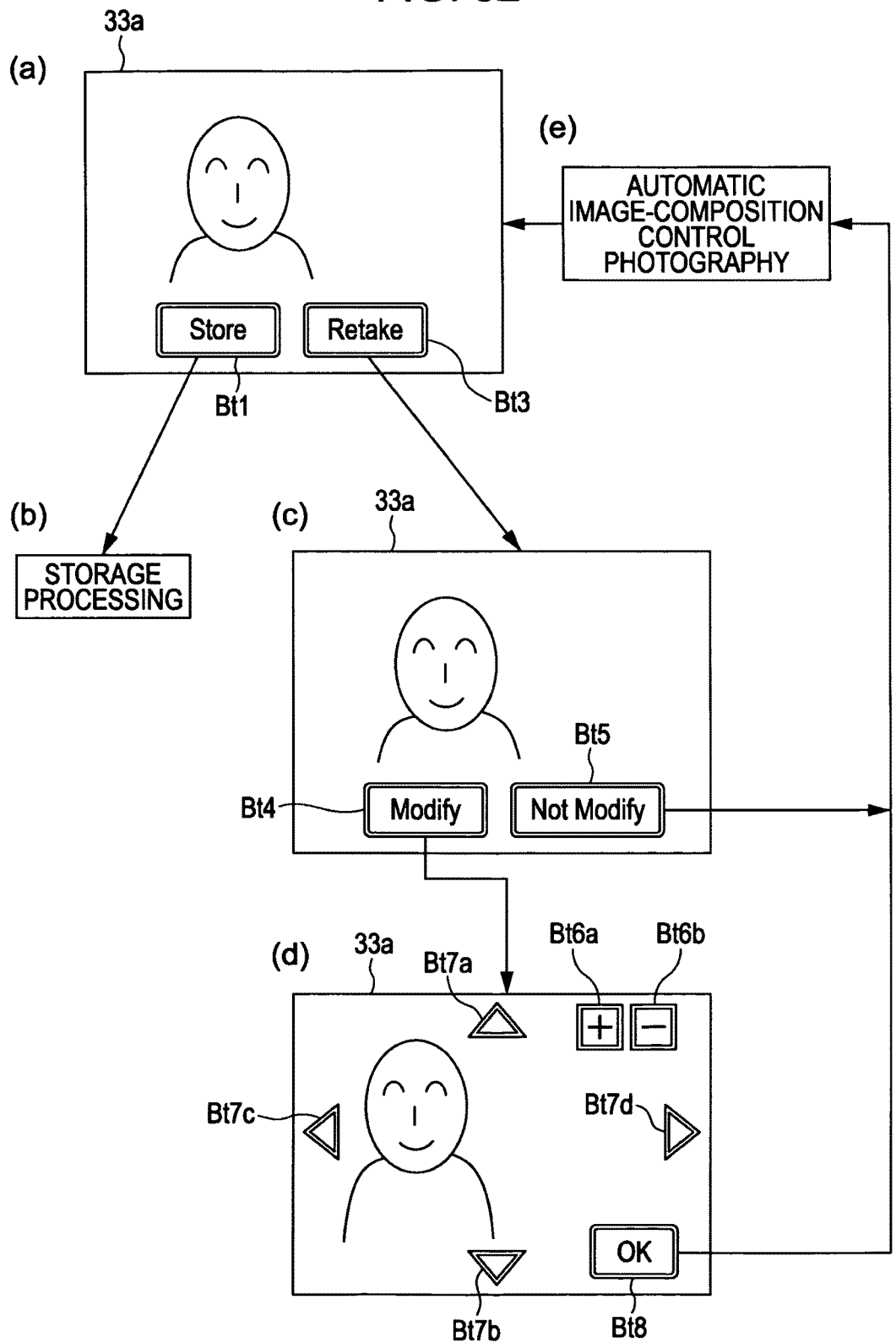
FIG. 32 illustrates an example of user-interface images displayed on the display screen section during shot-image presentation in a seventh example of the shot-image presentation operation.

When the "Store" button Bt1 is operated in the display state indicated by (a) in FIG. 32, the controller 27 executes control and processing for causing the data of the currently displayed shot image to be stored in the memory card 40, as in the case of the sixth example, as shown by a change from the state indicated by (a) in FIG. 32 to a state indicated by (b) in FIG. 32.

When the "Retake" button Bt3 is operated, the controller 27 switches the displayed operation images to a "Modify" button Bt4 and a "Not Modify" button Bt5 while displaying the same shot image, as shown by a change from the state indicated by (a) in FIG. 32 to a state indicated by (c) in FIG. 32.

When the screen indicated by (c) in FIG. 32 is displayed and an operation is performed on the "Not Modify" button Bt5, for example, the currently performed image reproduction and display for the shot-image presentation are stopped and the operation mode is directly switched to a mode for image-composition control photography, as shown by a change to a state indicated by (e) in FIG. 32. It is assumed in this case that a retake, i.e., an operation for shot-shot image photography, is executed after a subject is captured, and image-composition control is performed. As a result, as indicated by (a) in FIG. 32, the operation mode is switched to the shot-image presentation mode, in which the operation images "Store" button Bt1 and "Retake" button Bt3 are displayed together with the shot image.

In contrast, when the "Modify" button Bt4 is operated, the state of the display screen section 33a switches to a state in which modification operation images are displayed together with the same shot image, as shown by a change to a state indicated by (d) in FIG. 32.

The modification operation images include an "up" button Bt7a, a "down" button Bt7b, a "left" button Bt7c, and a "right" button Bt7d for moving the shot image (subject) in corresponding up, down, left, and right directions, and two other buttons, i.e., a "zoom-in" button Bt6a and a "zoom-out" button Bt6b denoted by "+" and "−", for increasing and reducing the zoom magnification. In addition, an "OK" button Bt8 is displayed.

The "up" button Bt7a, the "down" button Bt7b, the "left" button Bt7c, and the "right" button Bt7d are used to modify the position of the subject in the image frame.

That is, upon operation of the "up" button Bt7a, the "down" button Bt7b, the "left" button Bt7c, or the "right" button Bt7d, the entire displayed shot image moves in a direction corresponding to the operated button. Correspondingly, the subject in the shot image moves in the up, down, left, or right direction in the display area of the display screen section 33a. During the operation, the display area frame of the display screen section 33a serves as the image frame for the captured image. Thus, the user operates the "up" button Bt7a, the "down" button Bt7b, the "left" button Bt7c, and the "right" button Bt7d to move and adjust the position of the subject in the up, down, left, and right directions so that the position of the subject lies at a preferred location in the display area frame (which serves as the image frame) of the display screen section 33a.

The "zoom-in" button Bt6a and the "zoom-out" button Bt6b are used to modify the size of the subject in the shot image. In response to the operation of the "zoom-in" button Bt6a, the shot image being displayed is enlarged by image processing, and in response to the operation of the "zoom-out" button Bt6b, the shot image being displayed is reduced by image processing. As a result of the enlargement/reduction of the shot image, the size of the subject therein also changes.

During the operation, the display area frame of the display screen section 33a also corresponds to the image frame of the captured image. The user operates the "zoom-in" button Bt6a and the "zoom-out" button Bt6b to adjust the subject size to his/her preferred size relative to the display area frame of the display screen section 33a, while regarding the display area frame as the image frame.

After adjusting the position and the size of the subject in the image frame in the manner described above, the user performs an operation on the "OK" button Bt8. As a result, as shown by the change to the state indicated by (e) in FIG. 32, the image capture system enters the operation mode for the automatic image-composition control photography. In this operation mode, image-composition control is performed so that the subject position and size set in the state indicated by (d) in FIG. 32 are reflected, and automatic image-composition control photography is executed to photograph a shot image. For example, when it is assumed that the user modifies the subject position rightward, modifies the subject size to be larger, and operates the "OK" button Bt8 in the state indicated by (d) in FIG. 32, a shot image in which the subject is located rightward in a large size is obtained compared to the previous shot image.

A case in which the "Not Modify" button Bt5 is operated in the state indicated by (c) in FIG. 32 corresponds to a case in which the user is not particularly unhappy about the image composition or the like but is not satisfied with his/her facial expression or gesture shown in the shot image.

In contrast, a case in which the "Modify" button Bt4 is operated corresponds to a case in which the user is not satisfied with the image composure of the captured image, as can be understood from the above description. For example, an algorithm for performing control so that as many people as possible can have preferable impressions is generally employed for the automatic image-composition control photography.

However, there are cases in which such fixed image composition does not satisfy the users, depending on, for example, the users' sensitivities or image-capture states. Such user dissatisfaction can also be reduced or eliminated by the arrangement according to the seventh example, i.e., the arrangement in which the user can give an instruction for modifying the image composition and can re-execute automatic image-composition control photography.

Although the position and the size of the subject in the image frame are modified as the image composition in the state indicated by (d) in FIG. 32, this is merely one example.

For example, the arrangement may also be such that an exposure, white balance, and so on can be modified.

Figure 33:
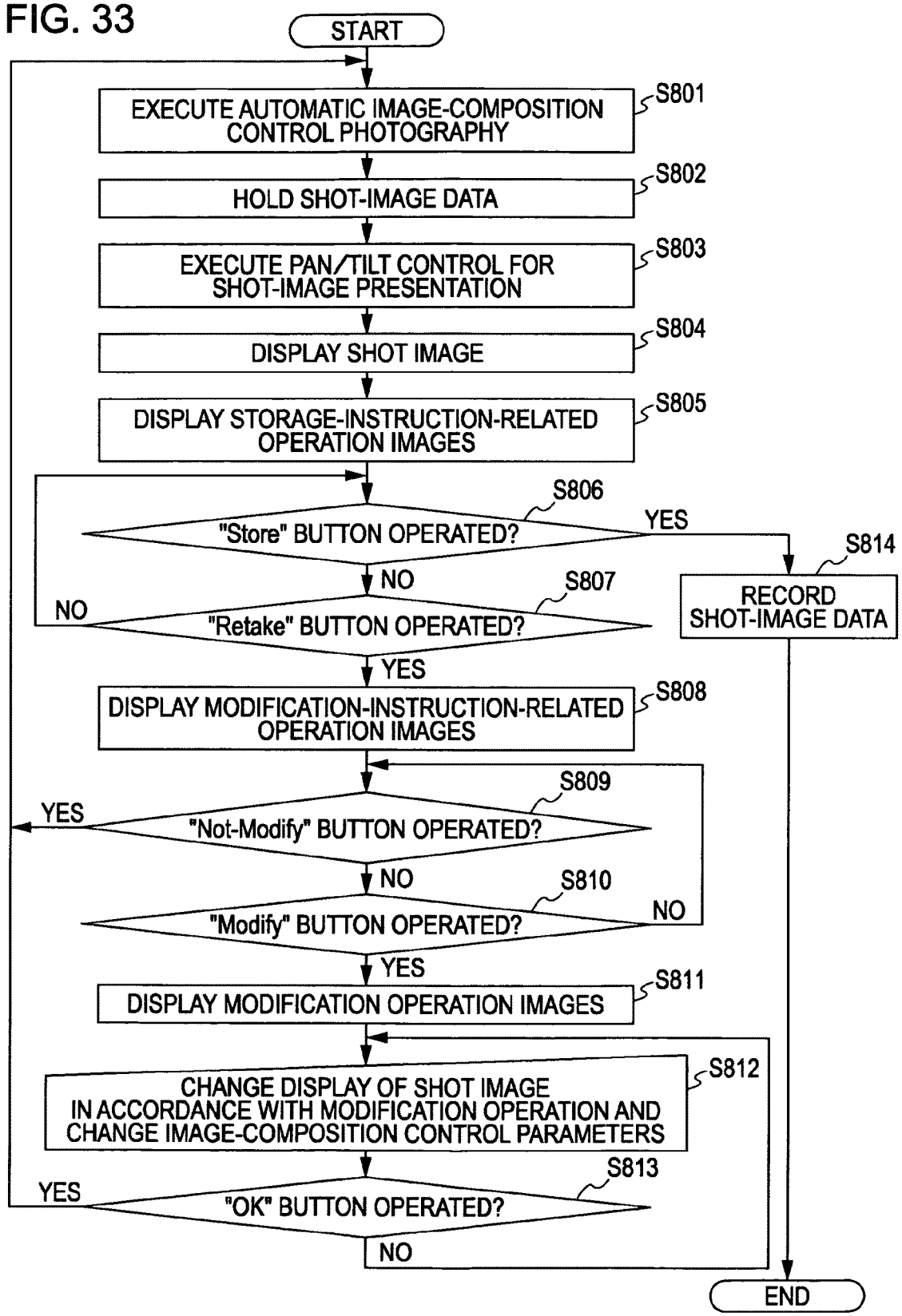
FIG. 33 is a flowchart illustrating an example of a processing procedure executed during shot-image presentation in the seven example of the shot-image presentation operation.

FIG. 33 is a flowchart illustrating an example of a processing procedure, executed by the controller 27 in the digital still camera 1, for the shot-image presentation in the seventh example.

The processing illustrated in FIG. 33 corresponds to processing performed when image display based on the shot-image presentation operation described with reference to FIG. 32 is performed each time one shot image is captured by the automatic image-composition control photography.

Referring to FIG. 33, in step S801, the controller 27 first executes control for executing an operation for the automatic image-composition control photography. When data of one shot image is obtained as a result of the automatic image-composition control photography, the controller 27 holds the shot-image data in step S802. At this point, the shot-image data is held in the RAM 29 and is not recorded to the memory card 40 yet.

In step S803, the controller 27 executes pan/tilt control for directing the image-capture direction F2 toward the subject person.

In conjunction with the pan/tilt control, in step S804, the controller 27 executes control for causing the display section 33 to display the image of the shot-image data held in step S802. In addition, in step S805, the controller executes control for causing, for example, the "Store" button Bt1 and the "Retake" button Bt3 indicated by (a) in FIG. 32, to be displayed superimposed on the shot image as storage-instruction-related operation images.

Next, in step S806 and step S807, the controller 27 waits until the "Store" button Bt1 or the "Retake" button Bt3 is operated.

When it is determined in step S806 that the "Store" button Bt1 is operated, the process proceeds from step S806 to step S814. In step S814, the controller 27 executes control for recording the shot-image data, held in step S802, to the memory card 40.

On the other hand, when the controller 27 determines that the "Retake" button Bt3 is operated, the process proceeds to step S808.

In step S808, the controller 27 stops display of the storage-instruction-related operation images, and executes control for causing, for example, the "Modify" button Bt4 and the "Not Modify" button Bt5 indicated by (c) in FIG. 32, to be displayed superimposed on the shot image as modification-instruction-related operation images.

Next, in steps S809 and S810, the controller 27 waits until the "Not Modify" button Bt5 or the "Modify" button Bt4 is operated.

When the "Not Modify" button Bt5 is operated, the process returns from step S809 to step S801 in which the automatic image-composition control photography is re-executed.

On the other hand, when the "Modify" button Bt4 is operated, processing in step S811 is executed.

Specifically, in step S811, the controller 27 stops display of the modification-instruction-related operation images, and executes control for causing, for example, the buttons indicated by (d) in FIG. 32, to be displayed superimposed on the shot image as modification operation images.

Next, in step S812, in accordance with an operation performed on the button(s) of the modification operation images, the controller 27 executes image processing control for making display changes, such as moving upward, downward, leftward, and/or rightward, and enlarging or reducing, to the shot image in the display area of the display screen section 33a. The controller 27 also changes values of image-composition control parameters from default values to the modification values corresponding to the operation performed on the button(s) of the modification operation images.

When the "OK" button Bt8 is operated in step S813, the process returns to step S801. In step S801, the controller 27 executes automatic image-composition control photography on the basis of the image-composition control parameters changed for modification in step S811. Consequently, a shot image in which the image composition modified by the user is reflected is photographed at this time.

The processing that the controller 27 executes on the user interface in the sixth example described above can be configured as a more simplified configuration based on the processing illustrated in FIG. 33.

<9. Pan/Tilt Drive Speed Control>

Pan/tilt drive-speed control that is applicable to all of the first to sixth examples of the shot-image presentation operation which are described above as modifications of the present embodiment will now be described with reference to a flowchart of FIG. 34. The procedure illustrated in FIG. 34 can also be regarded as being executed by the controller 27 in the digital still camera 1.

Figure 34:
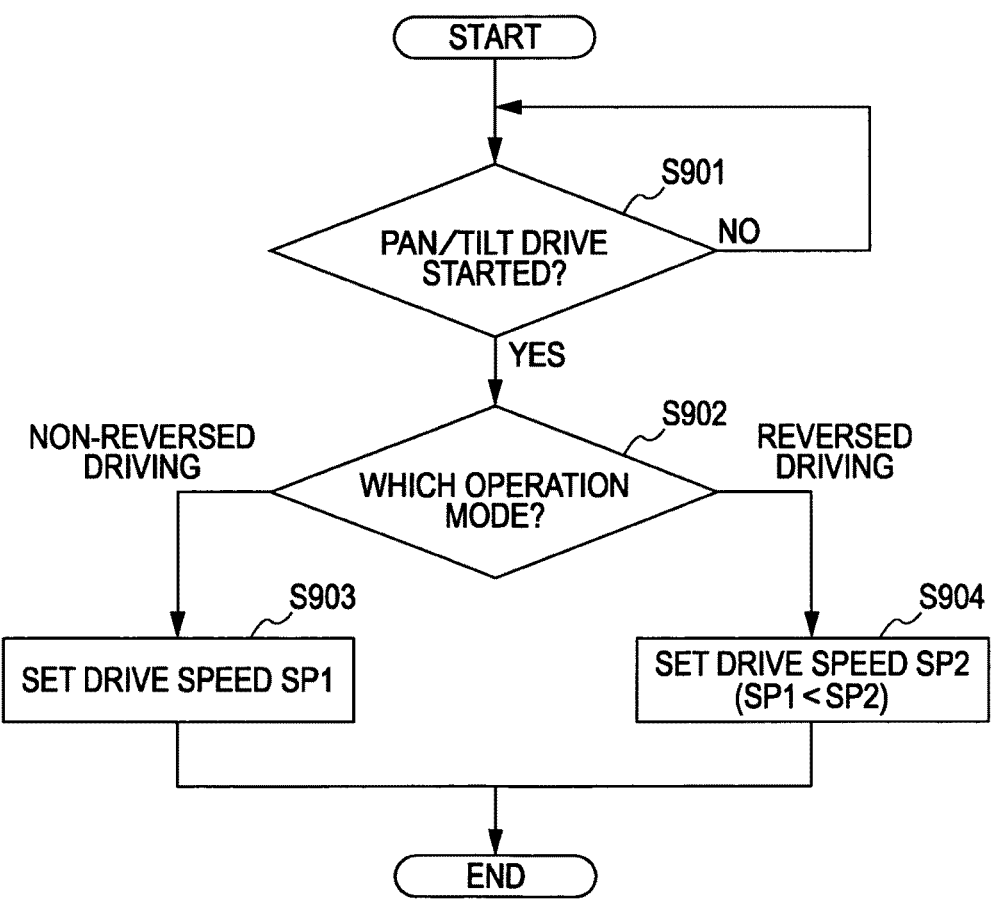
FIG. 34 is a flowchart illustrating a processing procedure for switching between a pan/tilt drive speed for reversed driving and a pan/tilt drive speed for non-reversed driving.

Referring to FIG. 34, first, in step S901, the controller 27 waits until at least one of the pan drive and the tilt drive is started.

For example, when at least one of the start instruction events, i.e., the pan drive and the tilt drive, occurs, the process proceeds to step S902.

In step S902, the controller 27 determines whether the started pan and/or tilt drive is performed by either the pan/tilt control for the operation mode for the shot-image presentation in the present embodiment or an operation mode other than for the shot-image presentation.

One example of the pan/tilt drive in the operation mode other than for the shot-image presentation is pan/tilt drive performed according to a user's panning/tilting operation. Another example is pan/tilt drive that is executed for image-composition adjustment, such as subject search, in the automatic image-composition control photography.

When it is determined in step S902 that the operation mode is an operation mode other than for the shot-image presentation, the process proceeds to step S903 in which the controller 27 sets a pan/tilt drive speed SP1 that is predetermined for the operation mode other than for the shot-image presentation. As a result of the setting processing, the pan and tilt mechanisms operate at a speed corresponding to the pan/tilt drive speed SP1.

On the other hand, when it is determined in step S902 that the operation mode is the operation mode for the shot-image presentation, the process proceeds to step S904 in which the controller 27 sets a pan/tilt drive speed SP2 that is predetermined for the operation mode for the shot-image presentation.

The pan/tilt drive speed SP2 is set higher than the pan/tilt drive speed SP1. As a result of the setting processing in step S904, the pan and tilt mechanisms move at a speed corresponding to the set pan/tilt drive speed SP2. Consequently, panning/tilting movement in the operation mode for the shot-image presentation is performed at a higher speed than that in other operation modes.

As described above, the pan/tilt drive in the operation mode other than for the shot-image presentation is caused by a subject search operation or a user operation. In such a case, if the speed of the panning/tilting movement is high, it is difficult to detect a subject during subject search or it is difficult to perform an operation since the panning/tilting movement becomes too responsive to the user operation. Thus, it is preferable that the speed of the panning/tilting movement in the operation mode other than for the shot-image presentation be low accordingly.

On the other hand, for the shot-image presentation, it is not necessary to consider the factor described above. Also, at a low speed, it takes time to reach a target pan/tilt position, which may cause stress to users in some cases. In this respect, for the shot-image presentation, it is preferable that the speed of the panning/tilting movement be set higher than that in other operation modes.

Accordingly, when the algorithm illustrated in FIG. 34 is used for the image capture system according to the present embodiment, the speed of the panning/tilting movement is appropriately switched, that is, is set to be high in the operation mode for the shot-image presentation and is set to be low in the operation mode other than for the shot-image presentation.

The speed of the drive in the pan direction and the speed of the drive in the tilt direction, the speeds being set as the pan/tilt speed SP2, do not necessarily have to be the same, and thus may be set to individual speeds that are suitable for the respective drives. The same applies to the pan/tilt drive speed SP1.

A digital still camera having a structure in which its lens portion can be reversed by 180° rotation is also available. In the digital still camera, when the rotation position of the lens portion is located at the display screen section side, the image-capture direction F1 and the display direction F2 are the same. When such a digital still camera is used as the image capture apparatus according to the present invention, the above-described pan/tilt drive for the shot-image presentation does not have to be performed in the state in which the image-capture direction F1 and the image-capture direction F2 are the same.

In such a case, therefore, for execution of the shot-image presentation operation, a determination is first made as to whether or not the current rotation position of the lens portion is located at the display screen section side. When it is determined that the current rotation position of the lens portion is located at the display screen section side, the image capture system may display a shot image, for example, at the same pan/tilt position without executing the pan/tilt drive control for the shot-image presentation. In contrast, the image capture system is configured so that, when it is determined that the current rotation position of the lens portion is not located at the display screen section side, pan/tilt drive control for the shot-image presentation is executed to display a shot image.

The processing procedures illustrated in the flowcharts have been described in the above embodiment as processing procedures that the controller 27 in the digital still camera 1 executes in accordance with a program.

However, the image capture system may be configured so that, for example, at least one of the processing procedures illustrated in the flowcharts is executed by the platform 10.

In the case of the first and second examples of the shot-image presentation operation in the present embodiment, a configuration in which the pan/tilt "reversal" driving is controlled by the platform 10 is conceivable as one example. That is, the digital still camera 1 issues, to the platform 10, a notification indicating that the automatic photography is executed. In response to the notification, the controller in the platform 10 obtains the pan position and the tilt position during the automatic photography, and determines a target pan position and a target tilt position for the reversal driving for the shot-image presentation on the basis of the obtained pan position and tilt position. In addition, the controller 51 drives and controls the pan mechanism section and the tilt mechanism section so that the target pan position and tilt position are reached.

Furthermore, when the image capture system in the third example described above is configured so that the captured-image data is transferred from the digital still camera 1 to the platform 10, the platform 10 can determine the center of each subject and the pan-direction and tilt-direction subject positions γx° and γy° to perform the reversal driving. With respect to the fourth and fifth examples, the captured-image data and the shot-image data may be transferred from the digital still camera 1 to the platform 10, so that the platform 10 can generate the information shown in FIGS. 27A to 27C and FIGS. 29A and 29B, hold the generated information, and execute the reversal driving. Moreover, the image capture system can be configured so as to cause the platform 10 to perform image-composition determination processing, image-composition adjustment control, and so on for the automatic image-composition control photography by using the captured-image data transferred from the digital still camera 1.

In addition, it is easily possible to configure the image capture system so that the platform 10 controls the drive-speed switching illustrated in FIG. 34.

In that respect, the digital still camera 1 and the platform 10 do not necessarily have to be independent apparatuses to serve as the image capture system according to the present invention, and thus may be integrated together. However, when the digital still camera 1 and the platform 10 are configured as independent apparatuses as in the embodiment, the digital still camera 1 can be used as a typical camera.

In practice, functions selected from the functions for the shot-image presentation operations in the first to fifth examples described above may be integrated into one image capture system. For example, when typical self-timer photography (which is not the automatic image-composition control photography) is performed, at least one of the functions in the first to third examples may be used to perform the shot-image presentation. In such an arrangement, during the automatic image-composition control photography mode, the function in the fourth or fifth example may be used to perform the shot-image presentation.

Although the above description has been given of a case in which the captured images, i.e., the shot images, are still images, the captured images may be moving images generated from images obtained through image capture.

As described above, at least part of the configurations disclosed herein may be realized by causing a CPU or DSP to execute a program.

Such a program may be stored in the ROM or the like by writing during manufacture or may be stored in the flash memory 30, a nonvolatile storage area for the DSP, or the like by installing (or updating) the program from a removable storage medium on which the program is pre-stored. The program may also be installed under the control of other host equipment via a USB (universal serial bus) or a data interface based on IEEE 1394 or the like. Additionally, the arrangement may be such that the program is pre-stored in a storage device in a server or the like on a network and the digital still camera 1 is equipped with a network function so that it can download and obtain the program from the server or the like.

It should be understood by those skilled in the art that various modifications, combinations, sub-combinations and alterations may occur depending on design requirements and other factors insofar as they are within the scope of the appended claims or the equivalents thereof.

What is claimed is:

1. An image capture system comprising:
    automatic photography controlling means for executing an automatic photography operation in response to a predetermined trigger to thereby obtain captured-image data from an image resulting from image capture performed by an image-capture section;
    a display section having a display screen section on which the image is displayed, the display screen section being provided so that a display direction thereof is different from a direction in which the image capture is performed by the image-capture section;
    a moving mechanism section having a mechanism for moving a movement unit so that the display direction is changed in conjunction with the image-capture direction, the movement unit having the image-capture section and the display screen section;
    captured-image display controlling means for executing display control on the display section so that the image of the captured-image data obtained by the automatic photography controlling means is displayed on the display screen section; and
    movement controlling means for controlling the moving mechanism section so as to automatically pan the display direction in response to a communication that is automatically generated by an imaging apparatus upon completion of self-timer photography, the automatic panning being performed in a direction and amount such that, after automatic panning, the display screen section faces a direction at which a person who was imaged in the photography operation was located when the photography operation was performed.

2. The image capture system according to claim 1, further comprising storage instruction operating means for allowing, when the captured-image display controlling means displays the image of the captured-image data on the display screen section, an operation to be performed to give an instruction indicating whether or not the captured-image data is to be recorded and stored into a storage medium.

3. The image capture system according to claim 2, further comprising re-photography instruction operating means for allowing, when the captured-image display controlling means displays the image of the captured-image data on the display screen section, an operation to be performed to give an instruction for re-executing the automatic photography operation without recording and storing the captured-image data into the storage medium.

4. The image capture system according to claim 3, further comprising modification instruction operating means for giving, when the operation is performed on the re-photography instruction operating means to give the instruction for re-executing the automatic photography operation, an instruction for modifying image composition to be obtained for the image of the captured-image data during the re-execution of the automatic photography operation.

5. The image capture system according to claim 1, wherein the movement controlling means controls the moving mechanism section so that a movement speed of the movement unit in the mode in which the image of the captured-image data is displayed on the display screen section is higher than a movement speed of the movement unit in another mode.

6. The image capture system according to claim 1, further comprising an image capture apparatus having the movement unit and a platform apparatus having the moving mechanism section, the image capture apparatus and the platform apparatus being physically independent from each other.

7. An image presentation method comprising the steps of:
    executing an automatic photography operation in response to a predetermined trigger to thereby obtain captured-image data from an image resulting from image capture performed by an image-capture section;
    executing display control so that the image of the obtained captured-image data is displayed on a display screen section, the display screen section being provided so that a display direction thereof is different from a direction in which the image capture is performed by the image-capture section; and
    controlling a moving mechanism section having a mechanism for moving a movement unit so that the display direction is automatically panned in response to a communication that is automatically generated by an imaging apparatus upon completion of self-timer photography, the automatic panning being performed in a direction and amount such that, after automatic panning, the display screen section faces a direction at which a person who was imaged in the photography operation was located when the photography operation was performed.

8. A program encoded on a non-transitory computer-readable medium that, when executed by a processor, causes an image capture system to perform the steps of:

executing an automatic photography operation in response to a predetermined trigger to thereby obtain captured-image data from an image resulting from image capture performed by an image-capture section;

executing display control so that the image of the obtained captured-image data is displayed on a display screen section, the display screen section being provided so that a display direction thereof is different from a direction in which the image capture is performed by the image-capture section; and controlling a moving mechanism section having a mechanism for moving a movement unit so that the display direction is automatically panned in response to a communication that is automatically generated by an imaging apparatus upon completion of self-timer photography, the automatic panning being performed in a direction and amount such that, after automatic panning, the display screen section faces a direction at which a person who was imaged in the photography operation was located when the photography operation was performed.

9. An image capture system comprising:

an automatic photography controlling section configured to execute an automatic photography operation in response to a predetermined trigger to thereby obtain captured-image data from an image resulting from image capture performed by an image-capture section;

a display section having a display screen section on which the image is displayed, the display screen section being provided so that a display direction thereof is different from a direction in which the image capture is performed by the image-capture section;

a moving mechanism section having a mechanism for moving a movement unit so that the display direction is changed in conjunction with the image-capture direction, the movement unit having the image-capture section and the display screen section;

a captured-image display controlling section configured to execute display control on the display section so that the image of the captured-image data obtained by the automatic photography controlling section is displayed on the display screen section; and a movement controlling section configured to control the moving mechanism section so as to automatically pan the display direction in response to a communication that is automatically generated by an imaging apparatus upon completion of self-timer photography, the automatic panning being performed in a direction and amount such that, after automatic panning, the display screen section faces a direction at which a person who was imaged in the photography operation was located when the photography operation was performed.

10. The image capture system according to claim 9, further comprising a storage instruction operating section configured to allow, when the captured-image display controlling section displays the image of the captured-image data on the display screen section, an operation to be performed to give an instruction indicating whether or not the captured-image data is to be recorded and stored into a storage medium.

11. The image capture system according to claim 10, further comprising a re-photography instruction operating section configured to allow, when the captured-image display controlling section displays the image of the captured-image data on the display screen section, an operation to be performed to give an instruction for re-executing the automatic photography operation without recording and storing the captured-image data into the storage medium.

12. The image capture system according to claim 11, further comprising a modification instruction operating section configured to give, when the operation is performed on the re-photography instruction operating section to give the instruction for re-executing the automatic photography operation, an instruction for modifying image composition to be obtained for the image of the captured-image data during the re-execution of the automatic photography operation.

13. The image capture system according to claim 9, wherein the movement controlling section controls the moving mechanism section so that a movement speed of the movement unit in the mode in which the image of the captured-image data is displayed on the display screen section is higher than a movement speed of the movement unit in another mode.

14. The image capture system according to claim 9, further comprising an image capture apparatus having the movement unit and a platform apparatus having the moving mechanism section, the image capture apparatus and the platform apparatus being physically independent from each other.

* * * * *